(12) United States Patent  
Levin

(10) Patent No.: US 8,915,241 B2
(45) Date of Patent: Dec. 23, 2014

(54) SOLAR RADIATION COLLECTION SYSTEM AND METHOD

(75) Inventor: Pavel Levin, Brooklyn, NY (US)

(73) Assignee: Vaposun Inc., Brooklyn, NY (US)

( * ) Notice: Subject to any disclaimer, the term of this patent is extended or adjusted under 35 U.S.C. 154(b) by 979 days.

(21) Appl. No.: 12/965,163

(22) Filed: Dec. 10, 2010

(65) Prior Publication Data

US 2011/0139888 A1    Jun. 16, 2011

Related U.S. Application Data

(60) Provisional application No. 61/284,114, filed on Dec. 14, 2009.

(51) Int. Cl.
| | | |
|---|---|---|
| F24J 2/44 | (2006.01) | |
| F24J 2/04 | (2006.01) | |
| F24J 2/24 | (2006.01) | |
| F24J 2/20 | (2006.01) | |
| F24J 2/23 | (2006.01) | |

(52) U.S. Cl.
CPC .. *F24J 2/23* (2013.01); *F24J 2/205* (2013.01); *Y02B 10/20* (2013.01); *Y02E 10/44* (2013.01)
USPC ............ 126/639; 126/634; 126/640; 126/651

(58) Field of Classification Search
CPC .......... Y02B 10/20; Y02E 10/44; F24J 2/205; F24J 2/20; F24J 2/202; F24J 2/204; F24J 2/23; F24J 2/32; C02F 1/14; B01D 1/00356
USPC .............. 126/650.2, 690, 609–616, 634, 636, 126/651, 658, 639; 137/101.27; 236/44 R, 236/13; 165/908, 911; 261/117, 156
See application file for complete search history.

(56) References Cited

U.S. PATENT DOCUMENTS

| | | | | |
|---|---|---|---|---|
| 2,184,094 | A | * 12/1939 | Daly et al. | ..................... 261/156 |
| 4,111,187 | A | 9/1978 | Wiegand | |
| 4,173,253 | A | * 11/1979 | Wiegand | ..................... 165/48.2 |
| 4,258,701 | A | 3/1981 | Buckley | |
| 4,296,729 | A | * 10/1981 | Cooper | ......................... 126/584 |
| 4,421,100 | A | 12/1983 | Yu | |
| 4,474,209 | A | * 10/1984 | Akhtarekhavari | ............ 137/559 |
| 5,314,116 | A | 5/1994 | Krauth | |

(Continued)

FOREIGN PATENT DOCUMENTS

JP         56138645          10/1981

OTHER PUBLICATIONS

I.I.Gogonin, Heat transfer in boiling liquid in a film moving under gravity, J. of Engnrng Physics and Thermophysics, Jul.-Aug. 2010, p. 876-877 (83-4), Ref.4, Springer, Belarus.

*Primary Examiner* — Avinash Savani
*Assistant Examiner* — Vivek Shirsat

(57) ABSTRACT

The invention relates to a radiant energy powered water heating methods and apparatus, particularly, to the open-loop solar radiation collection systems. At least one nozzle is directed against a reflection surface facing an evaporation surface to spray at least one jet with reflection to diffuse the fluid within the inner cavity in an atomized plume having the evaporation surface been moisturized by a part of the sprayed fluid and said moisturizing part of the sprayed fluid been sufficiently vaporized or evaporated (see FIG. 3).

18 Claims, 13 Drawing Sheets

(56) References Cited

U.S. PATENT DOCUMENTS

Figure 3:
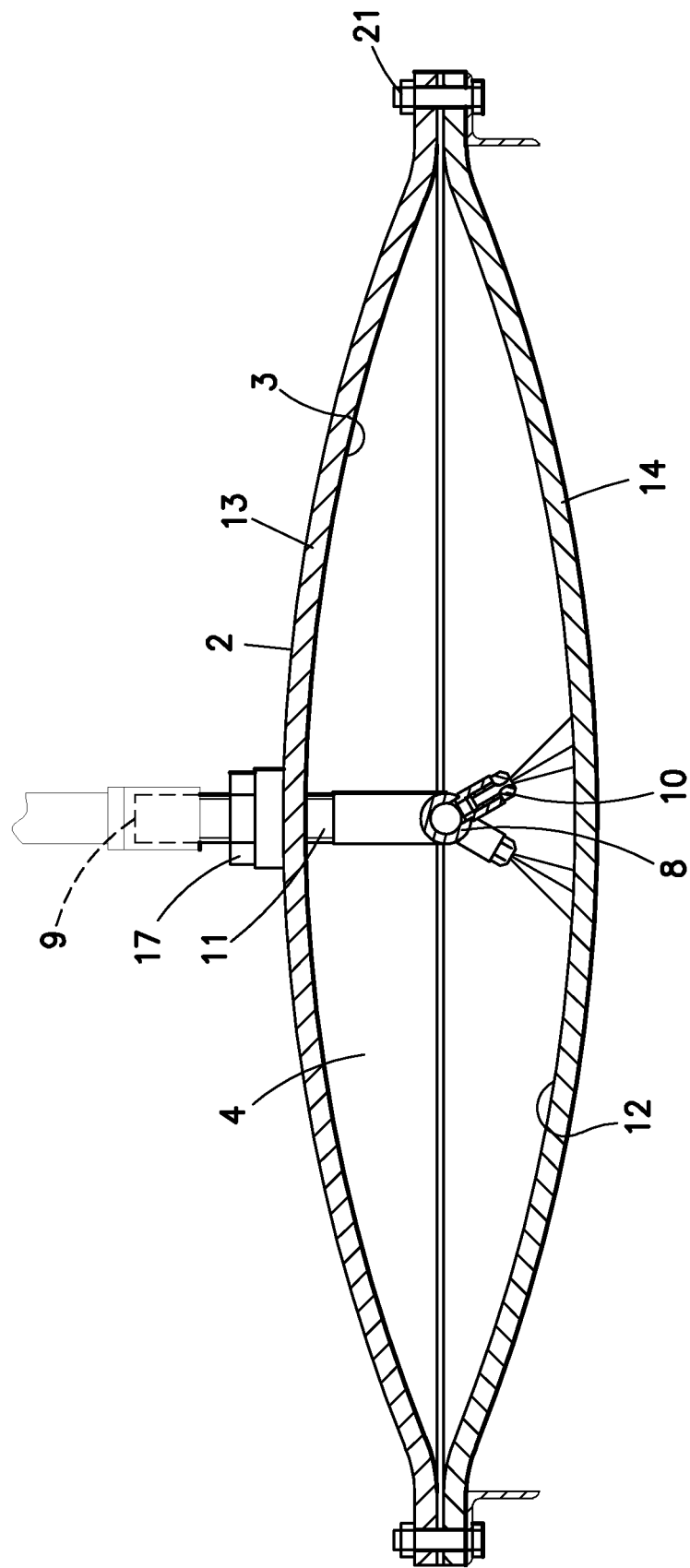

| | | |
|---|---|---|
| 5,507,436 A | 4/1996 | Ruttenberg |
| 5,650,050 A | 7/1997 | Kaufmann |
| 6,119,682 A | 9/2000 | Hazan |
| 2007/0221207 A1* | 9/2007 | Chien .......................... 126/621 |
| 2007/0285039 A1* | 12/2007 | Laing ............................ 318/439 |
| 2009/0277769 A1* | 11/2009 | Nichols ........................ 202/234 |

* cited by examiner

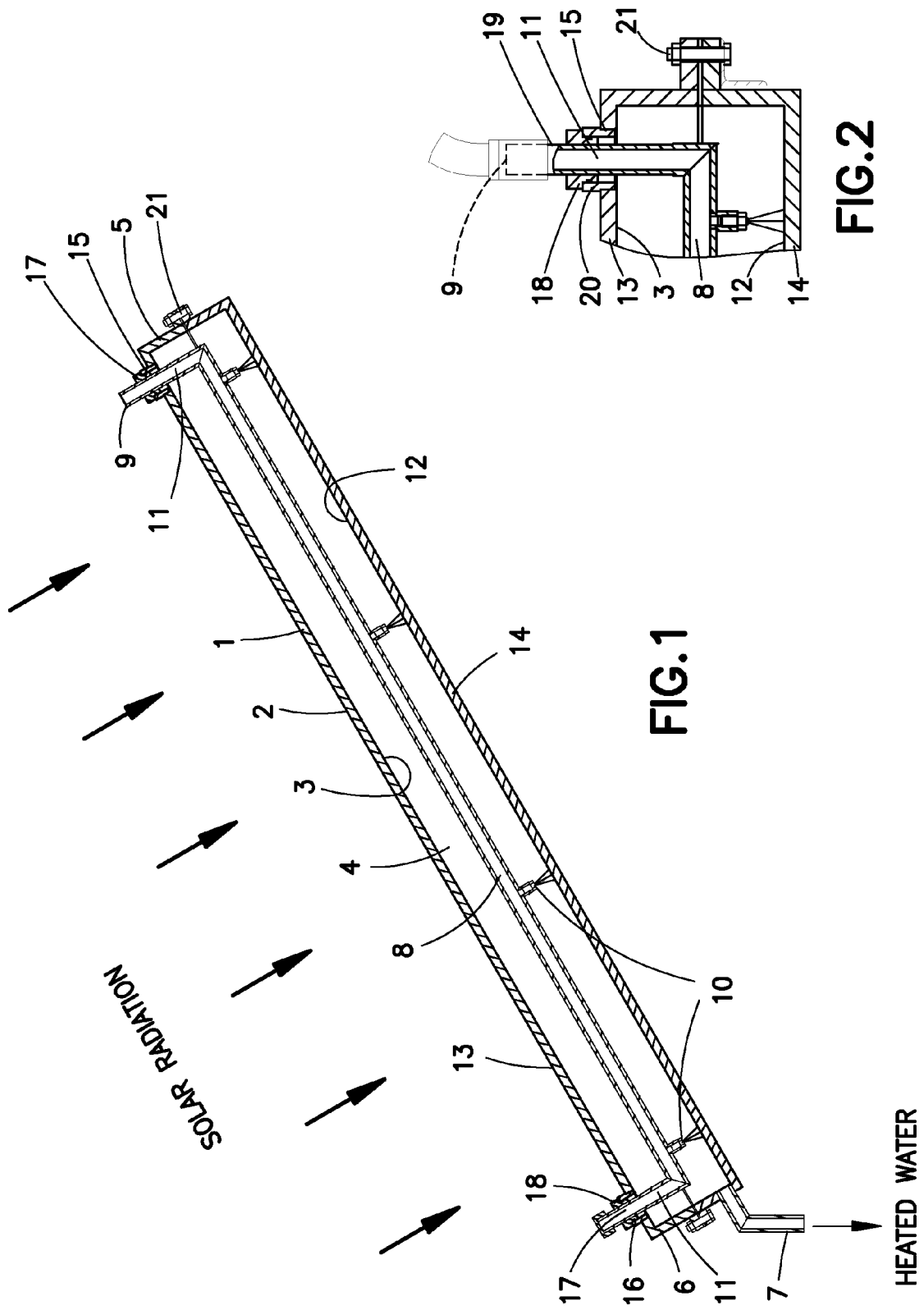

SOLAR RADIATION COLLECTION SYSTEM AND METHOD

CROSS-REFERENCE TO RELATED APPLICATIONS

Provisional application U.S. 61/284,114, priority filing date Dec. 14, 2009.

STATEMENT REGARDING FEDERALLY SPONSORED RESEARCH OR DEVELOPMENT

Not applicable.

REFERENCE TO COMPACT DISC APPENDIX

Not applicable.

BACKGROUND OF THE INVENTION

The present invention relates to methods and apparatus for collecting heat, such as solar radiant, energy by heating fluid, such as water. Particularly, the invention concerns a radiation collection system which comprises radiation-collection element and which may be a part of a water heating system in a building or facility. More particularly, the present invention relates to the open-loop solar energy powered systems providing hot water for domestic or other use simultaneously using it as a heat-collection and heat-transfer medium.

In solar collector panel (U.S. Pat. No. 4,258,701 to Buckley, publ. 1981 Mar. 31), which may be used in conventional open-loop solar water heating system, in its heat transmission module, a natural-circulation, solar collector, storage tank, insulation means for insulating and separating the storage tank from collector, and other unrelated parts are fabricated as a unitary structure capable of bearing load. Said panel solar collector is mounted with an inclination of a top solar-radiated surface to better receive radiant solar energy. Storage spread over wall surface acts as a thermal barrier to heat. When the circulating water temperature is low, the additional heating of the whole water storage tank is possible. However, with increasing the temperature of circulating water, sufficiently decreases the heat transfer through the collector wall and, correspondingly, the solar collection efficiency (at instantaneous solar radiation 850 W/m² for the circulating water temperature 50-70 degrees higher than the ambient temperature, the real efficiency of the collectors with advanced black-chrome glazed coatings is about 30-45%). The limited solar collection efficiency determines the lower balance temperature and correspondingly limited water-heating capacity. Due to the low velocity of line-pressure water circulation, the minerals from the water precipitate, clogging the narrow channels of the collector. The panel solar collectors of open-loop systems are susceptible to freezing in the cold-winter climate.

Close-loop indirect circulation system described in U.S. Pat. No. 4,421,100 to Yu (publ. 1983 Dec. 20) having the thermosyphon heat pipe water heating appliance uses latent heat of heat-transfer liquid in the separate low-pressure solar collector circuit connected to the tank. The collector is operated to vaporize the first heat-transfer fluid (Freon) to be condensed in upper duct so that the latent heat is transferred to the second low-pressure fluid in the tank with a ducting for passing to the third fluid (line-pressure water). The close-loop systems are complicated by having separate fluid circuits with energy losses at heat transfer from one circuit to another and sufficiently higher required circulating temperature of the first fluid that sufficiently decreases efficiency of solar collection. The evacuated-tube collectors using the heat-pipe principle, while more efficient than the flat-plate collectors at higher temperatures, are sufficiently more complex and expensive.

Close-loop indirect circulation system described in U.S. Pat. No. 6,119,682 to Hazan (publ. 2000 Sep. 19) having integrated flat solar radiation absorber panel and insulated fluid storage tank operates by thermosyphonic circulation of the heat-transfer liquid (demineralized water with added antifreeze substance, corrosion inhibitor, etc.) through the collector channels and conduits to the tank; an extended-length heat-exchange piping circuit with the line-pressure water; storage tank housing having a cold-water inlet port and hot-water outlet port and an electric water immersion heater. The two-circuit system has low heat-transfer and solar radiation collection efficiency and correspondingly low temperature of the water in the tank until the electric water immersion heater is used.

Modular solar radiation collector described in U.S. Pat. No. 4,111,187 to Wiegand (publ. 1978 Sep. 5) comprises spray means extending into the cavity formed by an upper radiation absorption surface and a lower drainage surface. Fluid is sprayed through nozzles spaced along water conduits situated in the internal cavity against the underside of said upper radiation absorption surface and drained through outlet means adjacent to the lower end cap. The spaced nozzle positioning against the underside of the upper radiation absorption surface creates its excessive moisturizing, which at comparatively week level of radiation, such as solar one, doesn't allow the water evaporating with its consequent condensation and latent heat utilization. Thus, due to low intensity heat transfer from said underside surface, the collector has low water-heating efficiency.

In the above prior art systems, the solar energy collection efficiency sufficiently decreases at high circulation temperature. Devices used, particularly, in the open-loop systems are characterized by low productivity and reliability, remarkably in the cold-winter climate. For increasing the heat-abstraction efficiency, the pulsating devices, as in the prior art apparatus described below, and corresponding methods may be used.

A boiling-film heat-transfer device containing a vertical copper tube with the heat transfer wall having an evaporation surface with the indentation of artificial pores of depth from 0.2 to 0.3 mm of the same diameter leads to a liquid film boiling with heat transfer enhancement up to 2.2-3.4 times comparatively with pool boiling (according to B. Haase, Der Warmeubergang am sidenden Rieselfilm, *Chem. Tech.*, 22H, 5. (Mai, 1970) 283-287—see I. I. Gogonin, Heat transfer in boiling liquid in a film moving under gravity, Journal of Engineering Physics and Thermophysics, July-August, 2010, p. 876-881 (83-4), Ref. 4). The high-efficient film boiling of liquid is associated with restricting the vapor flow from the wall by the entrainment of a portion of moisturizing liquid from a film after vapor bubble collapse, which is technically hardly achievable because requires a very accurate tailoring of the film conditions.

A heat accumulating device in Japan Patent 56138645 to Wada Takahiro (publ. 1981 Oct. 29) comprises a solar radiation collector and a heat exchanger connected with an indoor air conditioner and provided with an atomizing device fitted with an ultrasonic-wave oscillating element, which is purposed to enable condensation of solution by means of a low-temperature heat source by applying ultrasonic waves to diluted solution to make the same atomized and by heating the same later to be vaporized in the device wherein heat radiation and heat accumulation are performed by repeating dilution and condensation of the solution. By atomizing the diluted solution by means of the sufficiently powerful ultrasonic-wave oscillating element, the surface area of the solution is increased and the vaporization rate is accelerated, while the size of the droplet of liquid and the atomization rate can be controlled by varying the frequency and output of the ultrasonic waves. However using powerful ultrasonic device to sufficiently improve in such a way the heat transfer compromises the device reliability and health safety and requires additional energy consumption.

A pulsator in U.S. Pat. No. 5,314,116 to Krauth and Brunnengraeber (publ. 1994 May 24) comprises a casing having an expansible elastic tube defining partially an expansible chamber and adapted for control of an intermittent opening in said chamber by closing pressure-controlled valve in contracting position in at least near line contact, an inlet with flow control communicated to said expansible chamber. When the pressure in the chamber exceeds a predetermined level, the valve will open to intermittently discharge pulses of liquid. The normally closed valve preferably comprises an annular contact surface to induce near-instantaneous opening during a pulsating cycle. The elastic tube device is not reliable and, due to rheological properties of the elastic tube material, not applicable for high-frequency low-volume pulse flow with sufficient momentum; the bulky and complex design of the elastic tube is intended for irrigation but doesn't match into small space of the internal cavity for the solar-radiation collection purposes. Due to the above-mentioned scale factor and elastic characteristics varying with the temperature change, the elastic tube device doesn't provide reliably intermittent pulsating flow of the heated water.

A pulsating device for converting pressurized low-rate continuous flow to high-rate intermittent pulsating flow in U.S. Pat. No. 5,507,436 to Ruttenberg (publ. 1996 Apr. 16), which may be used for increasing the heat abstraction efficiency, comprises a somewhat expandable chamber having flow inlet with controlled flow rate and outlet provided with a small-diameter tube having a deflector and nozzle at an opposite end and a normally-closed pressure-responsive valve having a preset pressure response to create a water hammer effect. The valve contains expandable elastic sleeve and openings, which create a pumping effect to admix air with the affluent stream, ejecting fluid from said expandable chamber through said outlet in a high rate causing the volume and pressure of the liquid in said chamber to decrease and to close said outlet and openings, thereby to complete a cycle of an intermittent pulsating flow. However, it's hard to provide reliable characteristics of said elastic sleeve, which controls said preset pressure level and the pulse characteristics applicable for high-frequency low-volume high-velocity pulsating flow. The elastic properties vary at wide temperature range and don't provide the device reliability with durable low-varying pulse characteristics. While the spray means connected to this pulsator is claimed to be capable to spray liquids to a large designated area, the air-enriched atomized flow has insufficient momentum for creating required distinctive velocity plume in the space of internal cavity of solar radiation collector and would decrease the heat-abstraction efficiency.

Device for water desalination described in U.S. Pat. No. 5,650,050 to Kaufmann (publ. 1997 Jul. 22), including the elements of the solar heat abstraction, comprises an element arranged in an inclined position and having a top solar-radiated surface and a bottom evaporation surface within container having an inlet for water to be desalted and outlet for water vaporized or evaporated at said element; condenser coupled to said outlet arranged in an upper area of said container; rinsing means connected to water feed pipe containing nozzles arranged to spray water in a distributed manner against said bottom evaporation surface. The device contains a draining pipe coupled to a lower area of said container; openings arranged there through which outside air can be drawn in; and a suction device coupled to the said outlet in an upper area. In the method described in U.S. Pat. No. 5,650,050 to Kaufmann, the water is sprayed against the underside of the element; in order to evacuate the evaporating water avoiding its condensation within the element and draining with downward-running part of the sprayed water, the outside air motion is provided by a fan situated at lower area and suction device in the upper area, which sufficiently complicates the device functioning and decrease the heat transfer intensity and efficiency. In order to provide necessary heating of the surface by solar radiation, the water sprayed preferably for period of only a few seconds at predetermined by controlled valve intervals up to 90 minutes. To clean the element rinsing away deposited salt, the water may be sprayed, for initial cooling, every 0.5 to 1.5 hours for 0.67 to 2 minutes or, at low temperature, every 1 to 1.5 minutes for 1 to 6 seconds, preferably 2 to 4 s, which at least 1-minute-long spraying intervals are determined by the time necessary for the evaporating water evacuation during the solar-radiation powered evaporation process. Such relatively short spraying periods with intensive heat abstraction require powerful devices for vapor removal; such method and device are low-efficient for the water-heating purposes.

BRIEF SUMMARY OF THE INVENTION

The present invention addresses the task of creating a reflection-atomizing spray system for collecting heat, such as solar radiant, energy by heating fluid, such as water, and of the correspondent method, in which the disadvantages of the known technical solutions are avoided and which, therefore, are able to increase efficiency, productivity and reliability by means of combination of evaporative heat abstraction and the atomized plume creation in accordance with and due to the characteristics claimed herein. The plume of the atomized fluid spray is created by reflection of a jet emitted under sufficient pressure away from an evaporation surface onto a jet-reflection surface situated within an inner cavity. In the described below reflection-atomizing spray system and method, the technical contradiction between the required increasing the efficiency and the productivity, from one hand, and the limited vaporization capacity of the evaporation surface subjected, particularly, to relatively low-level solar radiation energy, from another hand, is reliably resolved.

A reflection-atomizing spray system for collecting heat, such as solar radiant, energy by heating fluid, such as water, comprises a supply means, in order to supply the fluid under pressure, and at least one heat-collection element having an inner cavity. Said at least one heat-collection element comprises:

- a heat-transmission wall having an evaporation surface in order to facilitate the fluid vaporization or evaporation from the evaporation surface within the inner cavity;
- at least one jet-reflection surface situated within the inner cavity;
- an inner cavity outlet means in order to evacuate the fluid from the inner cavity; and
- a spray means being in fluid communication with the supply means and comprising at least one nozzle in order to spray the fluid in at least one jet within the inner cavity.

At that, the at least one jet-reflection surface is positioned facing toward the evaporation surface; the at least one nozzle is directed away from the evaporation surface onto the at least one jet-reflection surface in order to have the at least one jet reflected from the at least one jet-reflection surface with a reflection direction onto the evaporation surface having the at least one reflected jet atomized in a plume within the inner cavity and the evaporation surface moisturized by the fluid in the plume.

A reflection-atomizing spray method for collecting heat, such as solar radiant, energy by heating fluid, such as water, comprises:
  supplying the fluid under pressure to an inner cavity of at least one heat-collection element having a heat-transmission wall;
  spraying the fluid in at least one jet within the inner cavity in order to facilitate the fluid vaporization or evaporation from an evaporation surface of the heat-transmission wall; evacuating the fluid from the inner cavity.

At that, the at least one jet-reflection surface is positioned facing toward the evaporation surface; the at least one jet is directed away from the evaporation surface onto at least one jet-reflection surface situated within the inner cavity in order to have the at least one jet reflected from the at least one jet-reflection surface with a reflection direction onto the evaporation surface having the at least one reflected jet atomized in a plume within the inner cavity and the evaporation surface moisturized by the fluid in the plume.

In a reflection-atomizing spray radiation-collection system for collecting radiant, such as solar, energy to heat fluid, such as water, comprising a supply means and at least one radiation-collection element having an inner cavity and comprising a heat-transmission wall of the inner cavity having an outer radiation-absorption surface to be heated by the radiant energy and an evaporation surface to facilitate the fluid vaporization or evaporation from said evaporation surface within the inner cavity partially defined by said evaporation surface, at least one reflection surface situated within the inner cavity and facing the evaporation surface, an internal cavity outlet means (like drainage outlet means) to evacuate the fluid heated within the inner cavity, and a spray means being in fluid communication with the supply means and comprising at least one nozzle to spray the fluid within the inner cavity. At least one of the at least one nozzle (i.e. a subset of at least one nozzle of the set of the at least one nozzle) is directed against the reflection surface to diffuse the sprayed fluid within the inner cavity having the evaporation surface been moisturized by the sprayed fluid.

In a preferable embodiment, the at least one reflection surface is provided with at least one positioning device to adjust a position of the diffused fluid plume relatively the evaporation surface and to control the fraction of the moisturizing part of the fluid and, thus, the heat-transmission wall temperature.

In a preferable embodiment, the at least one of the at least one nozzle is additionally provided with at least one nozzle positioning device to adjust a position of said at least one of the at least one nozzle relatively the at least one reflection surface, to adjust the diffused fluid plume to the evaporation surface, which is shaped concavely, thus moisturizing substantially entire the evaporation surface, and to control the fraction of the moisturizing part of the fluid.

For further increasing efficiency of use of the fluid latent heat, particularly, at low irradiance level, in the radiation-collection element the at least one of at least one nozzle is coupled with at least one pulsator means connected to the supply means to spray the fluid under pressure in intermittent pulsating flow, thus limiting the average flow rate of the fluid sprayed into the inner cavity and allowing more complete evaporation from the evaporation surface.

In another embodiment, exemplary as not particularly specified in the claims, at least one other of at least one nozzle (i.e. not belonging to the subset of at least one of the set of the at least one nozzle) is directed against the evaporation surface and coupled to the pulsator outlet means to spray additional limited fraction of the fluid onto said evaporation surface under the pressure in intermittent pulsating flow allowing more intensive complete evaporation from said evaporation surface.

In a radiation collection system the supply means comprising a piping connected to the spray means and a cold-fluid inlet means to supply the fluid under cold-fluid supply pressure, the radiation-collection system additionally comprises a collector means being in fluid communication with the internal cavity outlet means to collect the heated fluid and comprising at least one collector outlet means for thereby collected fluid. The collector means has a predetermined upper level of the (presumably heated) collected in such a way fluid and additionally comprises an upper level control means arranged to limit the cold fluid supply at least at (a level of the heated fluid) about said predetermined upper level of the collected fluid thus complying with the fluid-heating capacity of the system.

Preferably, the supply means additionally comprises a pump means having pump inlet and outlet sides, the pump inlet side is being in fluid communication with the at least one collector outlet means; the pump outlet side is connected to the spray means via the piping to supply the collected fluid thereto under working pump pressure.

In a further preferable embodiment, the cold-fluid inlet means is connected to the piping via a cold-fluid check (one-way) valve to restrict the cold fluid supply to the spray means at the working pump pressure exceeding about the cold-fluid supply pressure, thus to control the ratio of heated-to-cold fluid by changing the working pump pressure.

In a further preferable embodiment, the collector means additionally has a predetermined lower level of the collected fluid and comprises a lower-level control means. The lower-level control means comprises a feedback loop arranged to establish fluid communication between the pump outlet side and said collector means to restrict said fluid communication and the collected fluid supply at (a level of the collected fluid) about or lower than the predetermined lower level of the fluid. The pump outlet side is connected to the spray means (via the piping and) additionally via a working-pressure check (one-way) valve to restrict the collected fluid supply to the piping at the working pump pressure (at said working-pressure check valve) not exceeding about the cold-fluid supply pressure.

In a further preferable embodiment, the supply means additionally comprises a heater (boiler) means to maintain the temperature (and pressure) stability of the collected fluid (particularly to heat it additionally if necessary) and to supply thereby heated fluid for consumption; the pump outlet side is connected to the spray means via said heater (boiler) means and an additional working-pressure check valve to facilitate the cold fluid supply thereto (to the spray means) at the heater means (boiler) pressure not exceeding about the cold-fluid supply pressure, thus reducing energy consumption in the boiler stand-by regime.

Figure 4:
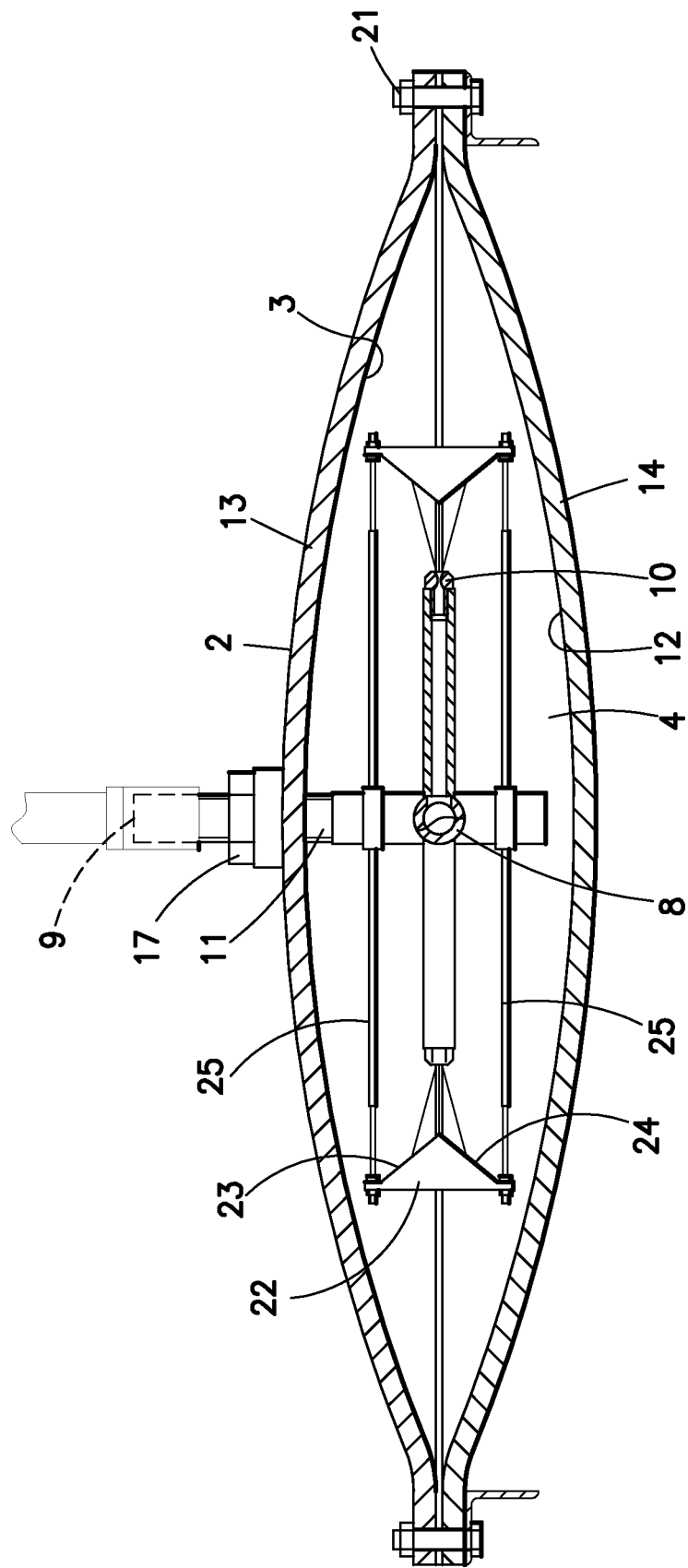
Figure 5:
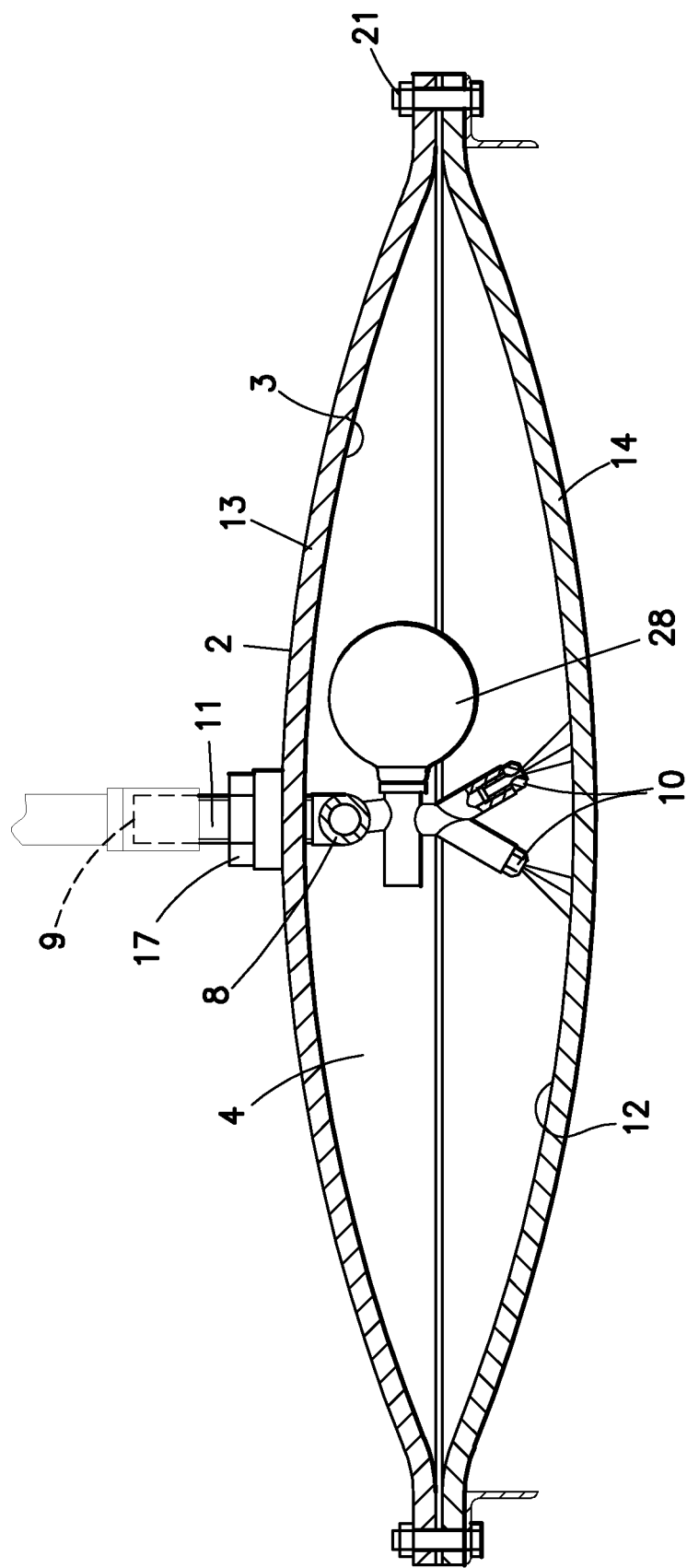
Figure 6:
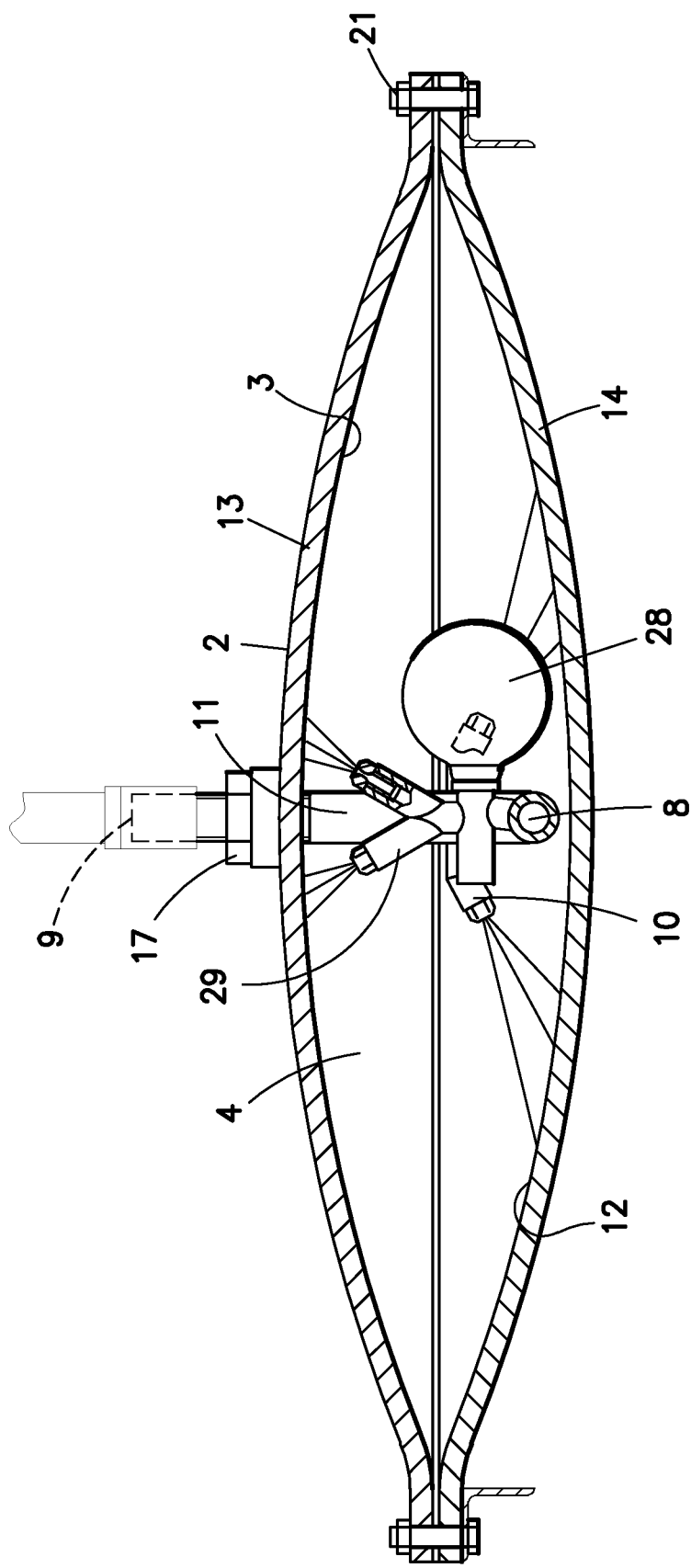
Figure 7A:
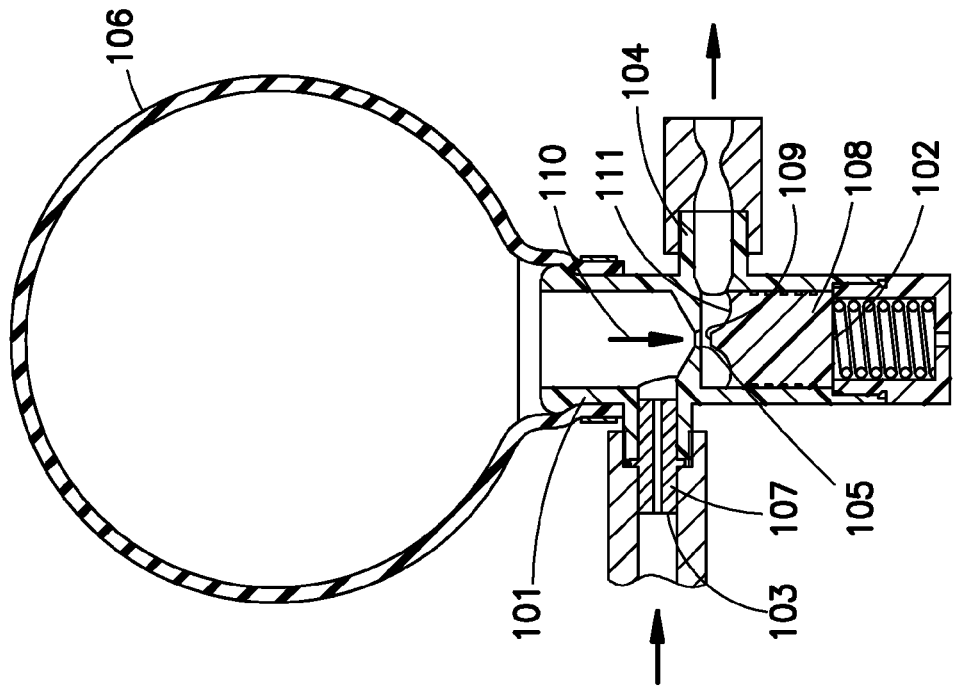
Figure 7B:
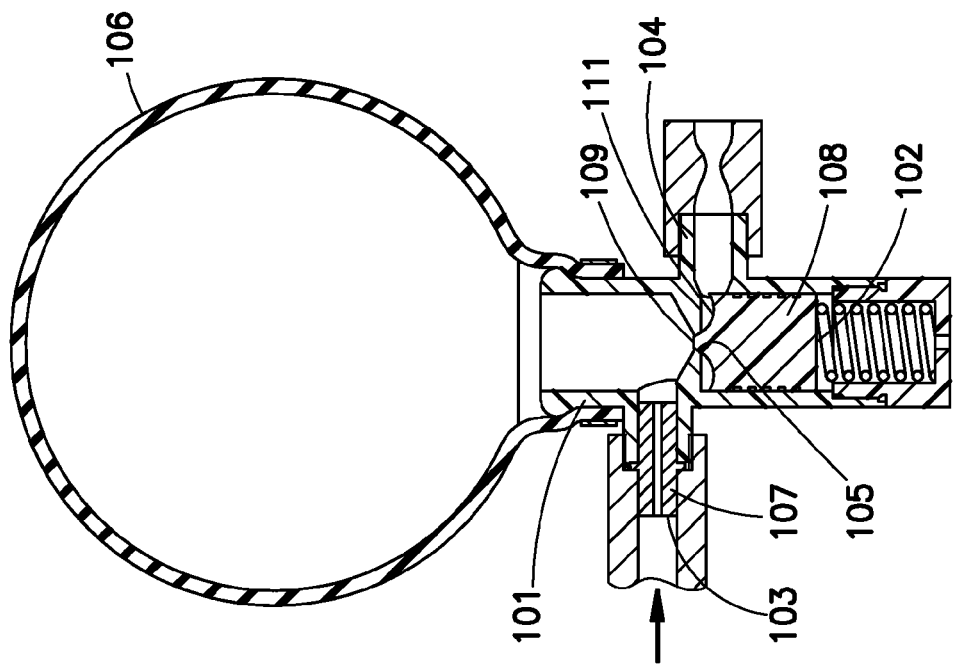
Figure 8:
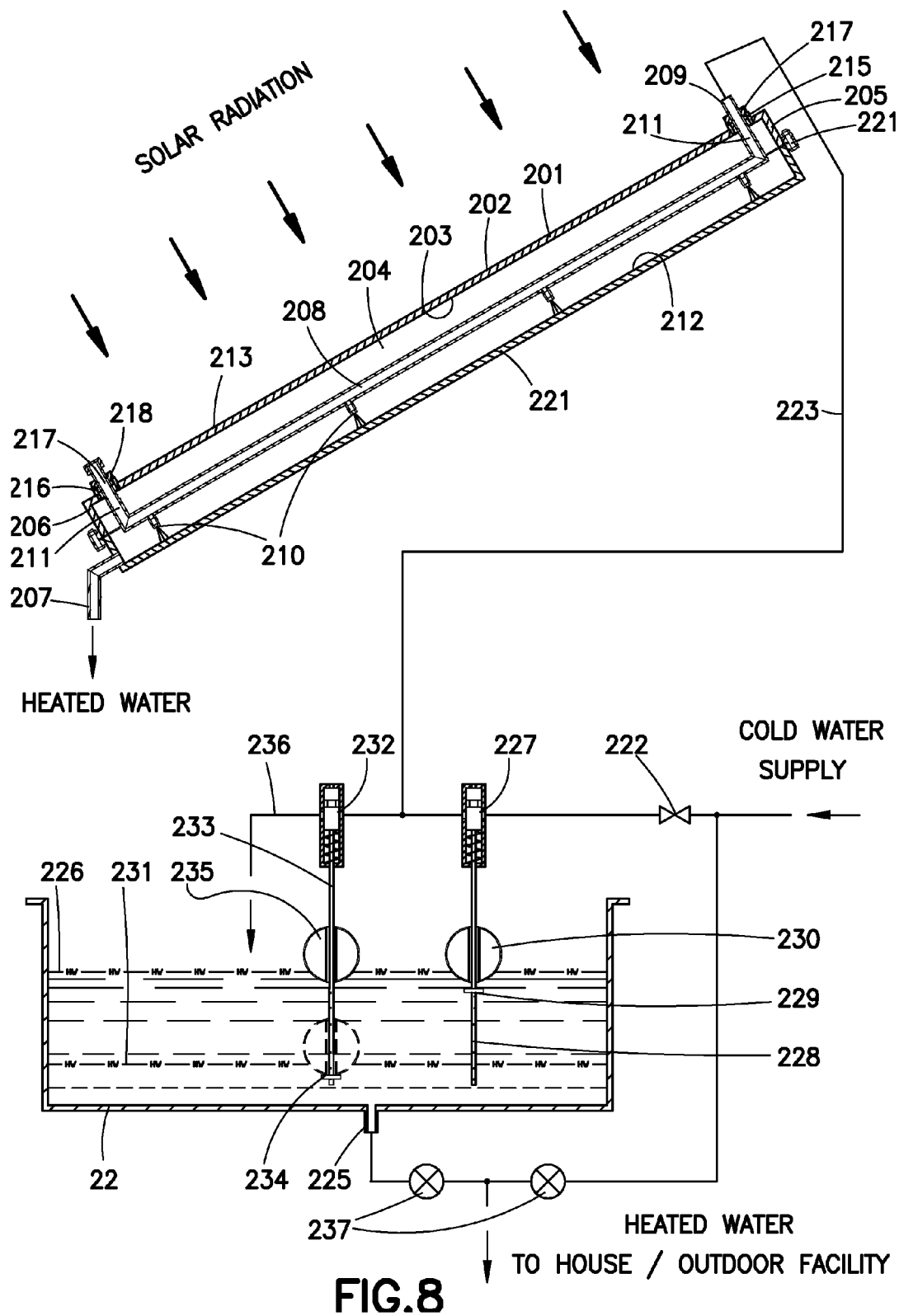
Figure 9:
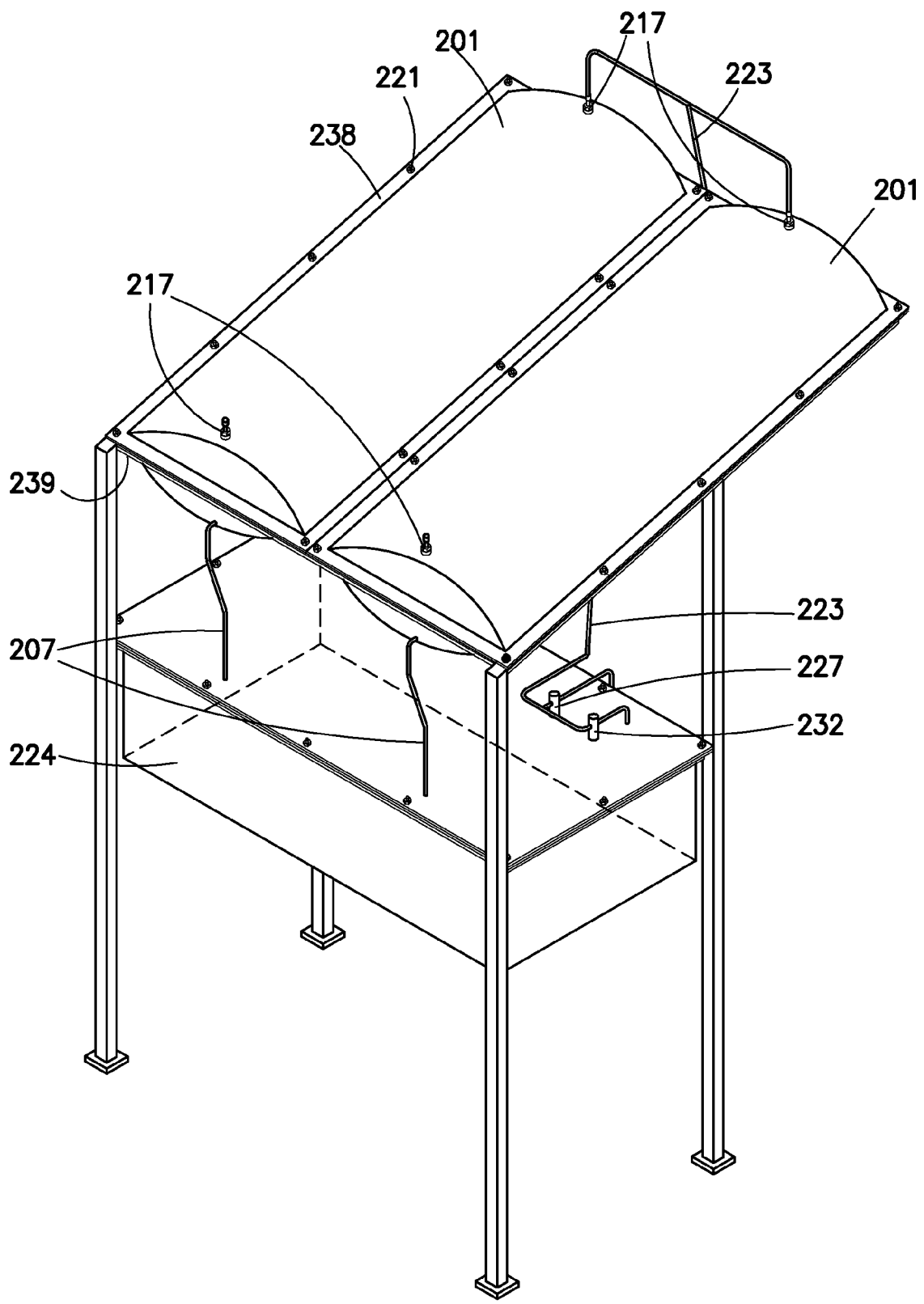
Figure 10:
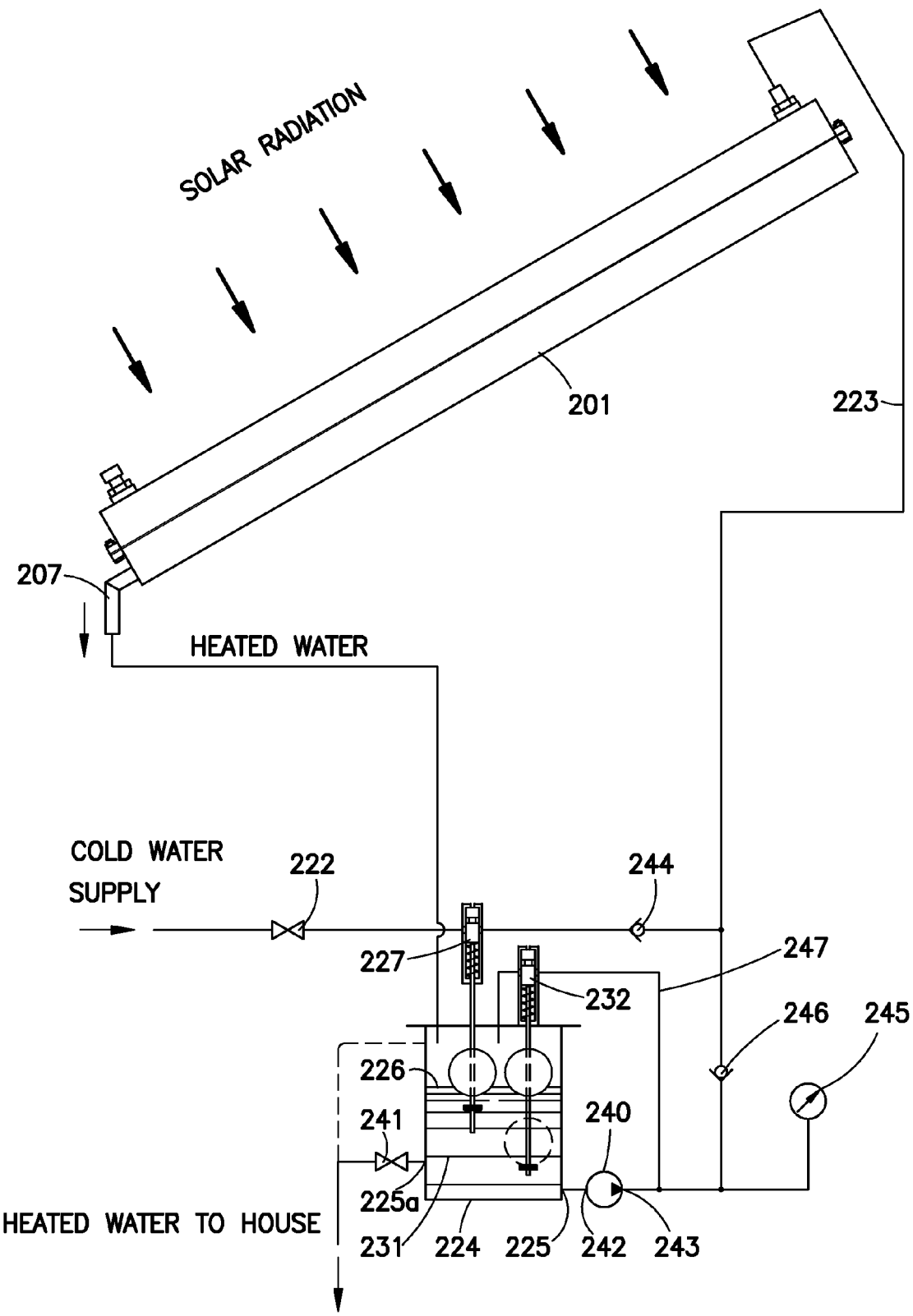
Figure 11:
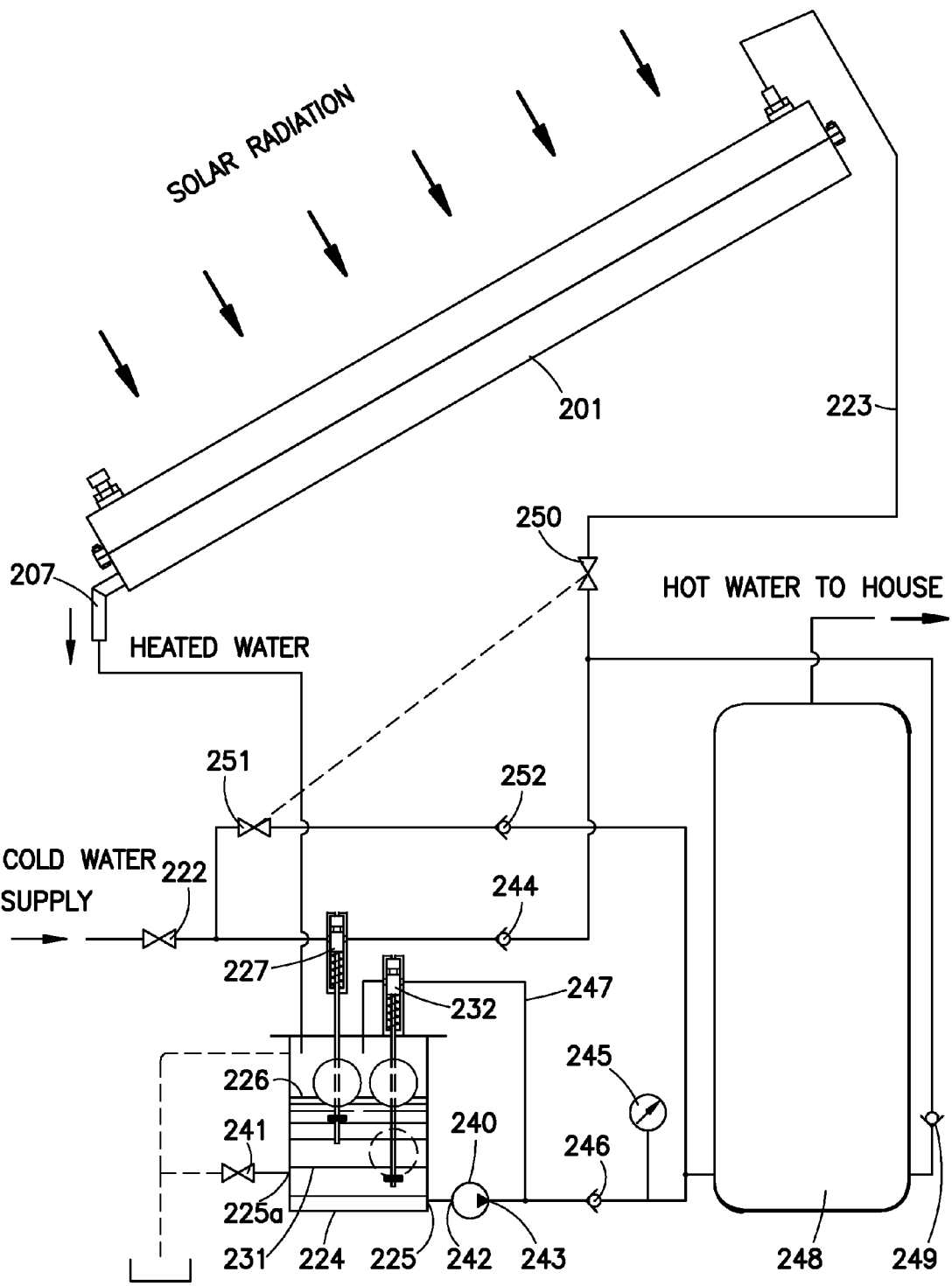
Figure 12:
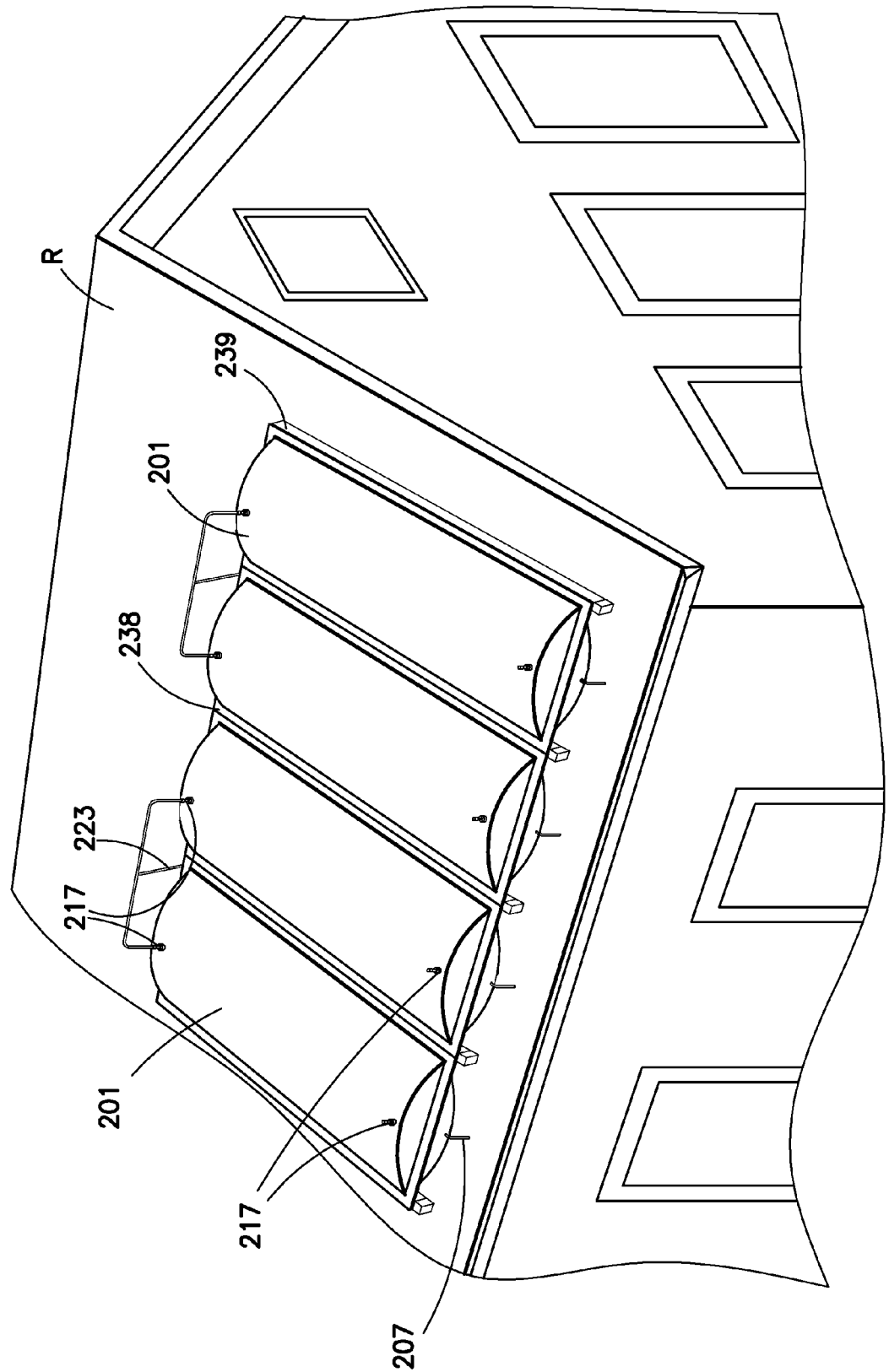
Figure 13:
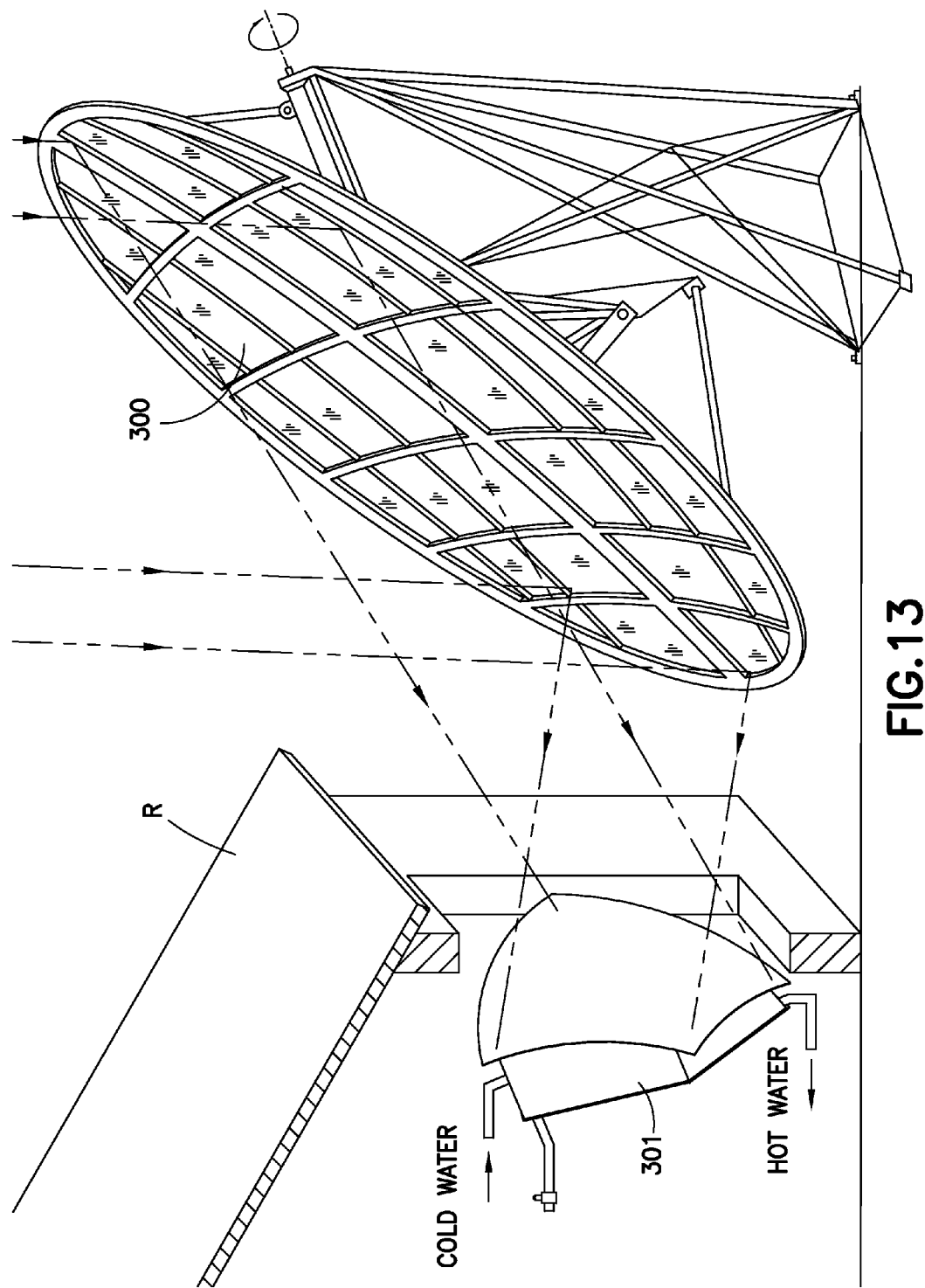
Figure 14:
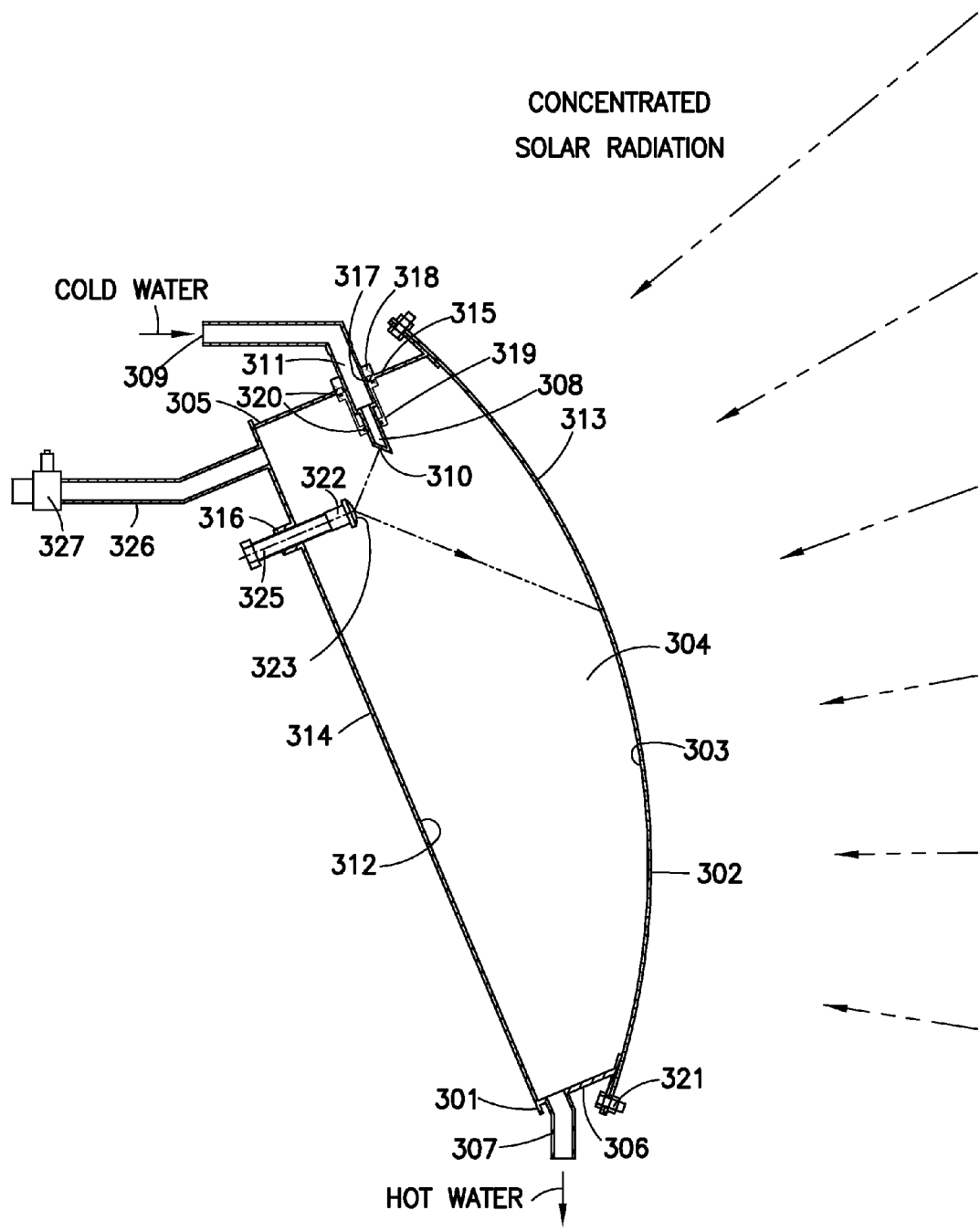

A pulsator of reflection-atomizing spray system for emitting intermittent pulsating flow is characterized to be having predetermined opening pressure and predetermined closing pressure in intermittent pulses of the fluid, the flow pressure being no more than about the predetermined opening pressure and being no less than about the predetermined closing pressure. The pulsator comprises a pressure container means and a normally closed valve means. The pressure container means, having a limited-flow-rate inlet means and an outlet means to be coupled to the nozzle of the reflection-atomizing spray system to facilitate the outward flow under the pressure, comprises an internal contact surface and an expandable elastic assembly being responsive to the fluid pressure in said pressure container means to provide a sufficient additional volume accessible for the fluid within said pressure container means at increasing of said fluid pressure from the predetermined closing pressure to the predetermined opening pressure. The normally closed valve means having closed and open positions, is preset at the predetermined opening pressure to restrict access of the fluid within the pressure container means to the nozzle-coupled outlet means in the closed position (at the fluid pressure less then nearly the predetermined opening pressure) and to provide said access in the open position (at no less than nearly the predetermined opening pressure). The normally closed valve means comprises at least one plug having initial working area being in fluid communication with said fluid within the pressure container means. Said at least one plug is engaged in the closed position with the internal contact surface in at least near closed-line contact defining said initial working area and is responsive to said fluid pressure no less than nearly the predetermined opening pressure to intermittently transfer into the open position by opening a clearance with said internal contact surface in an opening direction. In the proposed pulsator, said at least one plug has an additional working area having sufficient projection perpendicular to the opening direction and accessible to the fluid in the open position to apply the flow pressure (with changing the fluid momentum component) in the opening direction and to maintain said open position under the flow pressure until said fluid pressure decreases to nearly the predetermined closing pressure thereby to complete the intermittent pulsating flow cycle, realizing in such a way the short-period low-volume intermittent pulses with the flow pressure necessary and sufficiently high for effective spray atomizing by reflection, particularly for creation the fluid plume for the evaporation surface effective moisturizing with subsequent sufficient vaporization or evaporation therefrom.

Preferably, the plug of the pulsator has a form of a body of revolution with a surface of the additional working area surface being concave. (In other words, said additional working area surface is generated by a concave generatrix revolving around the axis directed opposite to the opening direction). For the plug working area projections perpendicular to the opening direction, a ratio of a sum of said initial working area and said additional working area projections to said initial working area projection is no less than nearly a ratio of the predetermined opening pressure to the predetermined closing pressure.

In a reflection-atomizing spray method of collecting radiant, such as solar, energy to heat fluid, such as water, comprising the steps of arranging respectively a radiation direction a radiation-collection element having an evaporation surface partially defining an inner cavity, said evaporation surface to be subjected to heating by the radiant energy thereby transferred, supplying the fluid to the radiation-collection element, spraying the fluid within the inner cavity with moisturizing the evaporation surface having said fluid to be heated therein, evacuating the heated fluid from the inner cavity to collect and/or to supply it for consumption or additional heating, the spraying is performed in at least one jet against (onto) at least one reflection surface situated within said inner cavity with diffusing the sprayed fluid in a plume adjusted (particularly, by the jet position control, flow speed, and capacity) within said inner cavity relatively the evaporation surface to moisturize the evaporation surface by a part of the sprayed fluid having said moisturizing part of the sprayed fluid been sufficiently (on the sufficient part of said evaporation surface moisturized area) vaporized or evaporated (with restricting the vapor flow from the evaporation surface by the heat exchange with the remaining liquid and heating all the sprayed fluid, by heat transfer to remaining, not vaporized or evaporated part of the fluid), thus using the latent heat of the moisturizing part of the sprayed fluid and enhancing the fluid-heating efficiency.

In a preferable embodiment of the method, the spraying is performed with adjusting a position of the at least one reflection surface to control a fraction of the moisturizing part of the sprayed fluid and the heated fluid (the evaporation surface) temperature (and/or to moisturize sufficiently entire the evaporation surface), thus more completely using the latent heat of the moisturizing part of the sprayed fluid and further enhancing the fluid-heating efficiency of the method.

Preferably, the moisturizing part of the fluid comprises no more than 20% of the mass of the fluid sprayed within the inner cavity, thus optimizing using the latent heat of the moisturizing part of the sprayed fluid and further enhancing the fluid-heating efficiency of the method.

For further increasing efficiency of use of the fluid latent heat in the method, particularly at low irradiance level, the fluid is sprayed within the inner cavity in intermittent spraying pulses at nearly predetermined intervals; the heated fluid temperature is controlled by the time of the nearly predetermined intervals between the pulses.

The nearly predetermined intervals between the pulses are set for time no less than the time of the intermittent spraying pulse to have the moisturizing part of the sprayed fluid nearly completely evaporated.

The nearly predetermined intervals are set for time less than about 60 seconds, preferably, no more than about 10 times as much as the time of intermittent spraying pulse, to prevent sufficient decreasing of the fraction of the fluid vaporized or evaporated in the inner cavity.

In contradistinction to the above prior art systems, the present invention achieves higher radiation collection efficiency and the circulation temperature in the open-loop system by means of more effective use of the latent heat of the part of the sprayed fluid evaporated or vaporized at the evaporation surface. Particularly, the contradiction between the limited vaporization capacity of the evaporation surface and the greater technical capacity of the nozzle was resolved thus enhancing the fluid-heating efficiency. The method is characterized by the higher efficiency and productivity; the system is easy in maintenance and reliable, remarkably in the cold-winter climate.

BRIEF DESCRIPTION OF THE SEVERAL VIEWS OF THE DRAWING

There are shown in the drawings embodiments of the invention as presently preferred. However, the invention is not limited to the shown exemplary arrangements. The preferred embodiments of the invention are illustrated by drawings as follows:

FIG. 1: Radiation-collection element according to the principles of the invention, schematically in a longitudinal cross-section;

FIG. 2: Fragmentary sectional detail including the fluid-feed tube positioning device.

FIG. 3: Radiation-collection element with one reflection surface, in a transverse cross-section;

FIG. 4: Radiation-collection element embodiment with the reflecting wedge, in a transverse cross-section;

FIG. 5: Radiation-collection element with a pulsator, in a transverse cross-section;

FIG. 6: Radiation-collection element embodiment with additional nozzles and a pulsator, in a transverse cross-section;

FIG. 7A: The pulsator, cross-sectional view in the closed position;

FIG. 7B: The pulsator, cross-sectional view in the open position;

FIG. 8: Solar radiation collection system, shown as it may be applied to a small house or an outdoor facility, schematically and partly in a longitudinal cross-section;

FIG. 9: Solar radiation collection system with a solar energy collector structure of two radiation-collection elements as it may be applied to an outdoor facility, in a perspective view;

FIG. 10: Solar radiation collection system additionally including a pump means to provide the fluid circulation, as it may be applied to a small house, schematic view;

FIG. 11: Solar radiation collection system including an additional heater means (boiler) as it may be applied for a house or a building with multiple consumers, schematic view;

FIG. 12: A house structure with the solar radiation collector assembly mounted on the roof, in a perspective view;

FIG. 13: Concentrated solar power radiation-collection system mounted on the roof, as it may be applied for a house or a building with multiple consumers, in a perspective view;

FIG. 14: Radiation-collection element embodiment as a concentrated solar power receiver, schematic view.

DETAILED DESCRIPTION OF THE INVENTION

The following detailed description is of the best presently contemplated mode of carrying out the invention. The description is not intended in a limiting sense, and is made solely for the purpose of illustrating the general principles of the invention. The disclosed embodiments are merely exemplary of the invention, which may be embodied in various forms. Therefore, specific structural and functional details disclosed herein are not to be interpreted as limiting, but merely as a basis for the claims and a representative basis for teaching one skilled in the art to variously employ the present invention in virtually any appropriately detailed system and design of its elements. The advantages of the present invention may be more readily understood with reference to the following detailed description taken in conjunction with the accompanying drawings.

Referring more particularly to the drawings, first the solar radiation-collection element as a main part of reflection-atomizing spray solar radiation collection system is presented according to the invention. As best illustrated at FIG. 1, the solar radiation-collection element includes casing of radiation-collection element 1 having an outer black-coated (for example, black-chromed) and preferably glazed radiation-absorbing surface 2 to be heated by solar radiation and an evaporation surface 3 underneath the radiation-absorbing surface 2. The evaporation surface 3 defines an inner cavity 4 bounding it from the upper side. The casing of radiation-collection element 1 has also a top end 5 and a bottom end 6; a drainage outlet 7 is situated at the lower point of the bottom end 6. (In another embodiment, not shown, the drainage outlet 7 is situated above the lower point of the bottom end 6 to create within the inner cavity 4 a fluid pool sufficient for temporary heat accumulation). The casing of radiation-collection element 1 is adapted to be mounted at inclination and inclined to better receive radiant solar energy and to facilitate the water vaporization or evaporation from the evaporation surface 3 and gravity drainage of the fluid (specifically water) heated within the inner cavity 4 through the drainage outlet 7. The solar radiation collection system comprises also an elongated fluid-feed tube 8 connected to a water inlet 9 and provided with nozzles 10. The elongated fluid-feed tube 8 is attached from two sides to two vertical tubes 11 composing a three-part spray tube. One of the vertical tubes 11 is provided with the water inlet 9. The elongated fluid-feed tube 8 is longitudinally extended within the inner cavity 4; and nozzles 10 with the orifice diameters ranged from 0.5 to 1.5 mm (dependently on the solar radiance level and on the correspondent radiation-absorbing area) are spaced along it to spray the fluid within the inner cavity 4. The inner side of the casing of radiation-collection element 1 comprises inner surfaces defining the inner cavity 4, particularly, along with the evaporation surface 3, a reflection surface 12 facing the evaporation surface 3. The spray tube 8 has one of the nozzles 10 or more, specifically at present example—all four pairs of the nozzles 10 coupled thereto and directed against the reflection surface 12 on the distance 10-100 orifice diameters therefrom (shown with jets directed thereonto) to diffuse the fluid within the inner cavity 4 with moisturizing the evaporation surface 3 by a part of the diffused fluid.

In the described preferable embodiment, the casing of radiation-collection element 1 consists of an upper heat-transmission sheet 13 and a lower water-reflection sheet 14 coupled together. The upper transmission sheet 13 (thickness 0.5-5 mm) has the outer radiation-absorbing surface 2, which is blackened and glazed, and the inner evaporation surface 3. The lower water-reflection sheet 14 has the reflection surface 12. The top and bottom supports 15, 16 with the fluid-feed tube positioning devices 17 are attached to the upper transmission sheet 13. The top and bottom supports 15, 16 are provided with a fluid-feed tube positioning device 17 having an adjusting nut 18 to adjust the nozzles 10 position and the distance between the nozzles 10 and the reflection surface 12 to adjust the diffused fluid plume to the evaporation surface 3.

In operation, the radiation-collection element is arranged respectively a solar radiation direction having an evaporation surface 3 to be subjected to heating by transferred radiation energy. The fluid is supplied to the radiation-collection element through the inlet 9 and sprayed in jets from nozzles 10 within the inner cavity 4. The jets are directed onto the reflection surface 12 to diffuse the fluid within said inner cavity with moisturizing the evaporation surface by a part of the fluid in the diffused plume to enhance the water-heating efficiency. After arranging a position of jets from nozzles 10 relatively the reflection surface 12, the fluid to be diffused within the inner cavity 4 and nearly entire the evaporation surface 3 to be moisturized by a part of the sprayed fluid with practically complete vaporization or evaporation of said moisturizing part of the sprayed fluid and having a draining part of the fluid within the inner cavity 4 to be heated by the evaporated moisturizing part of the fluid. The heated fluid is evacuated from the inner cavity 4 through the drainage outlet 7 to collect it and supply for consumption to house or outdoor facility or for additional heating.

Experiments show the wide velocity distribution range in the diffused water plume after the water reflection from the reflection surface 12, from zero to twice as average velocity and more; that allows effective control of the fraction of the moisturizing part of the fluid falling on the evaporation surface 3 by adjusting the distance from nozzles 10 to the reflection surface 12, causing nearly the entire the evaporation surface 3 to be moisturized by the moisturizing part of the fluid. The distance between nozzles 10 and the reflection surface 12 is adjusted by the fluid-feed tube positioning device 17 regulating the diffused water velocity distribution in the diffused water plume after reflection from the reflection surface 12. With decreasing said distance, the diffused water velocity is increased and so the fraction of the moisturizing part of the fluid falling on the evaporation surface 3. Said distance is being decreased while complete fluid vaporization or evaporation is provided on sufficient part of said evaporation surface 3 area. Practically, at given water supply and water-heating productivity, said distance is been optimized by the criteria of maximization of the temperature of the water supplied for consumption through the drainage outlet 7 thus enhancing the fluid-heating efficiency of the radiation-collection element. At optimized distance between the nozzles 10 and the reflection surface 12, the entire said evaporation surface 3 is moisturized by the moisturizing part of the fluid with its complete vaporization or evaporation.

In contradistinction to the prior art methods, in the reflection-atomizing spray method, the spraying is performed, particularly onto the reflection surface, with partition of the fluid on moisturizing and remaining parts to moisturize the evaporation surface by a part of the sprayed fluid having said moisturizing part of the sprayed fluid sufficiently vaporized or evaporated and thus transferring heat to the draining part of the fluid with increased efficiency. The heated fluid temperature is controlled by the relative position of the jet and the reflection surface relatively the evaporation surface.

In contradistinction to the prior art radiation-collection systems comprising radiation-collection elements, employing in the present invention at least one reflection surface in conjunction with nozzles directed against said at least one reflection surface allows diffusing the sprayed fluid in a plume within said inner cavity with its partition on moisturizing and remaining (immediately draining) parts. As well understood by those skilled in the art, a number and a shape of reflection surfaces situated within the inner cavity 4 may vary in the different embodiments of the radiation-collection element with nozzles 10 directed against said reflection surfaces to better diffuse the fluid within the inner cavity 4 with moisturizing of the practically entire evaporation surface 3 by the moisturizing part of the sprayed fluid at given output of the spray means (specifically of the nozzles 10). The relative positions of said reflection surfaces and nozzles 10 of the fluid-feed tube 8 are to be optimized for each embodiment to gradually enhance the water-heating efficiency of the radiation-collection element providing complete vaporization or evaporation from the evaporation surface 3 at given solar radiance level.

The top-side part of the fluid-feed tube positioning device 17, as shown at FIG. 2, comprises an adjusting nut 18 situated on a thread 19 of the vertical tube 11 and secured in the adjusted position of the elongated fluid-feed tube 8 by a stopper sleeve 20 welded to the upper transmission sheet 13. The vertical tube 11 having the fluid inlet 9 is joined from another side to the elongated fluid-feed tube 8. The bottom side part of the fluid-feed tube positioning device 17 is designed analogously to the top side part shown but with a plugged fluid inlet. The positioning device design is exemplary and may vary for the different spray means embodiments as well understood by those skilled in the art.

The moisturizing part of the fluid (specifically water) accounts for no more than 20% of the mass of the water sprayed within the inner cavity, which fraction is controlled by the fluid-feed tube positioning device 17. The moisturizing part of the fluid is supposed to be evaporated from at least sufficient part of the evaporation surface 3 area and its latent heat of vaporization to be used for heating of the remaining part of the fluid to no more than the temperature when intensive vaporization starts. At larger than 20% fraction of the moisturizing part of the water, the draining (evacuated) fluid would be overheated with its unnecessary evaporation (or, at excessive water supply, the evaporation surface 3 would be overcooled with evaporation inhibition and correspondent heat abstraction efficiency decreasing). The efficiency of the radiation collection is evaluated by the criteria of heated fluid temperature optimization at given fluid flow using known methods of measurement of the temperature of the drained fluid (evacuated water) at the drainage outlet 7. After the moisturizing part fraction optimization by said criteria, the process (water supply) productivity is being established for specified radiation-collection element water temperature difference.

For example, at the moisturizing part accounting for 12% of the mass of the water sprayed within the inner cavity, the remaining part of the water may be heated by the radiation-collection element water temperature difference up to 70 degrees with efficiency about 50-70% dependently on the temperature difference and the coating type, which would be 1.3-1.6 times as high as for the known open-loop systems with thermosyphonic circulation or evacuated-tube collectors. At decreasing the solar radiation intensity at the same water supply, the evaporated fraction of the moisturizing part of the fluid is decreasing from 100% to 50% and the radiation-collection element water temperature difference is correspondingly established at about 35 degrees (decreasing from 70 degrees). For maintaining the same temperature difference, the water supply pressure should be reduced (for example, from 5 bar to 3.6 bar, reducing the process productivity by 50% at the same fraction of the moisturizing part of the fluid 12% and at the same nozzle orifice diameter, for example, 0.7 mm) or, for maintaining the same process efficiency, the fraction of the moisturizing part of the fluid should be decreased to 8-10% with lesser reducing the process productivity (by 25-35%) and moderately lower temperature difference establishing (about 50 degrees).

The radiation-collection element in the preferred embodiment, as shown in a section view at FIG. 3, has nozzles 10 directed against the reflection surface 12 (shown with jets directed thereonto) with angle deviation from the vertical position to prevent shadowing by the fluid-feed tube 8 and provide more uniform distribution of the diffused water on the evaporation surface 3. The upper heat-transmission sheet 13 and the lower water-reflection sheet 14 are arched and coupled at flanges by bolts 21. (Correspondingly, the evaporation surface 3 is shaped concavely.) For the nozzle 10 angle deviation adjustment, the fluid-feed tube 8 may be composed from few relatively angularly adjustable tubes as well understood by those skilled in the art. The shown angle deviation of nozzles 10 from vertical position is exemplary and may be adjusted from 0 to 85 degrees experimentally providing more uniform distribution of the moisturizing part of the diffused water on the evaporation surface 3.

The radiation-collection element in another preferred embodiment suitable for the case of relatively low line pressure of the cold water, as shown in a section view at FIG. 4, additionally has at least one positioning element carrying an adjusted reflection surface, in the concrete embodiment of reflection surfaces in a form of two partition wedges 22. Two partition wedges 22 situated within the inner cavity 4 are formed each by one pair of reflection surfaces 23, 24, in each pair one surface is facing and another is turned away from the evaporation surface 3. The reflection surfaces 23 face the evaporation surface 3; the reflection surfaces 24 face the lower water-reflection sheet 14. The nozzles 10 are directed against the partition wedge 22. The partition wedges 22 are mounted on bottom and top adjusting screws 25 to adjust the distance between the each partition wedge 22 and the nozzles 10.

In operation of the described radiation-collection element, the distance from nozzles 10 to the partition wedges 22 mounted on the adjusting screws 25 is adjusted by their nuts arranging a position of the corresponding jets relatively reflection surfaces 23, 24 to cause said jets to be partitioned within the inner cavity 4 by the partition wedge 22 and regulating the diffused water velocity plume after reflection from the partition wedges 22 to cause nearly the entire said evaporation surface 3 to be moisturized by the moisturizing part of the fluid reflected from the reflection surface 23 or from both reflection surfaces 24 and 12. With decreasing the distance between the nozzles 10 and the partition wedge 22, the diffused water velocity is increased and so the fraction of the moisturizing part of the fluid falling on the evaporation surface 3. Said distance, as well as one between the nozzles 10 and the evaporation surface 3, is being decreased while the fluid vaporization or evaporation intensifies on sufficient part of the evaporation surface 3 area. Intensification of the fluid vaporization or evaporation corresponds to higher heat abstraction from the evaporation surface 3 and to higher the process efficiency. Practically, at given water supply and water-heating productivity, said distance is been optimized by the criteria of maximization of the temperature of the water supplied for consumption through the drainage outlet 7 thus enhancing the fluid-heating efficiency of the radiation-collection element. At optimized distances between the nozzles 10 and the partition wedge 22 and between the nozzles 10 and the evaporation surface 3, the entire evaporation surface 3 is moisturized by the moisturizing part of the fluid with its complete vaporization or evaporation. After the distance adjusting, the maximum productivity of the water supply through the fluid inlet 9 is being established for the required radiation-collection element water temperature difference.

The radiation-collection element in another preferred embodiment suitable for relatively low solar radiance level, as shown in a section view at FIG. 5, additionally comprises a pulsator 28 situated within the inner cavity 4. In this case, the number of nozzles should not be diminished due to requirement of moisturizing uniformity; their orifice diameter should not be decreased due to nozzle reliability requirement; the water pressure and, correspondingly, the jet speed could not be reduced sufficiently because of necessity of the water reflection with creation the distinctive diffused water plume. The nozzles 10 connected to the fluid-feed tube 8 collectively have relatively high instantaneous emitted fluid rate. Each pair of the nozzles 10 is being in fluid communication with the fluid inlet 9 via the pulsator 28 to spray the fluid within the inner cavity in intermittent pulsating flow at nearly predetermined intervals and limit the evaporation surface 3 moisturizing thus limiting the average flow rate of the fluid sprayed into the inner cavity 4, allowing more complete evaporation from the evaporation surface, and increasing efficiency of use of the fluid latent heat in the radiation-collection element The fluid is sprayed within the inner cavity 4 with high instantaneous velocity determined by the water pressure and the nozzle 10 orifice diameters. The spraying is performed in intermittent spraying pulses at predetermined intervals to limit the water average flow rate and control the evaporation surface 3 moisturizing thus preventing its overcooling and allowing more complete evaporation of the moisturizing part of the fluid. The heated fluid temperature is controlled by the time of the nearly predetermined intervals between the pulses. For example, the nozzles 10 with diameter 1 mm have their position been adjusted relatively the reflection surface 12 to moisturize substantially entire evaporation surface 3. After letting the water flow through the fluid inlet 9, for optimizing the heated water temperature difference at about 70 degrees, the predetermined intervals between the pulses are set for time at least the time of the intermittent spraying pulse to provide nearly complete evaporation of the moisturizing part of the fluid and sufficient concentration of the fluid vaporized or evaporated within the nearly entire inner cavity 4 to the time of the next pulse that facilitate effective heat transfer to the remaining part of the fluid.

For example, for the intermittent spraying pulse time in a range about 0.1-0.5 s, the predetermined interval between the pulses is set for time about 0.5 s; the spraying pulse period— correspondingly up to 1 second. For the heated water temperature optimization in a case of decreased solar radiation intensity, the predetermined intervals between the intermittent spraying 0.5-second pulses may be increased, for example, to 1 second. The predetermined intervals are set for time less than about 60 seconds, preferably—from about the minimum pulse time to about 10 times as much as the time of the intermittent spraying pulse (that accounts for about 5 second in this case) to prevent sufficient decreasing of the concentration of the fluid vaporized or evaporated within the inner cavity 4. At predetermined intervals between the pulses 60 seconds or longer, the concentration of the fluid vaporized or evaporated will be insufficient with correspondingly lower efficiency of the heat transfer to the remaining part of the fluid diffused within the inner cavity 4.

The radiation-collection element in another embodiment suitable for relatively high solar radiation intensity, as shown in a section view at FIG. 6, comprises a pulsator 28 situated within the inner cavity 4 and at least one other (additional) nozzle 29 connected to the fluid-feed tube 8. Specifically at present example, all additional nozzles 29 are being spaced in pairs along the fluid-feed tube 8 as every other with the nozzles 10 and directed against the evaporation surface 3 and at angle 20 degrees with the vertical. Each pair of the additional nozzles 29 are in fluid communication with the fluid inlet 9 via the pulsator 28 to spray the fluid onto the evaporation surface 3 in intermittent pulsating flow. The nozzles 10 are in constant fluid communication with the fluid inlet 9 to spray the fluid within the inner cavity with a constant flow rate. The angle deviation of nozzles 10 from vertical position is about 60 degrees for better moisturizing the evaporation surface 3 from its sides.

In the described system operation, the moisturizing part of the fluid is sprayed in jets through the nozzles 10 in intermittent spraying pulses at nearly predetermined intervals, moisturizing the central part of the evaporation surface 3 that allows, at constant high rate of remaining liquid emitted through the additional nozzles 29, to decrease the fraction of the moisturizing part of the fluid at increased process productivity and, correspondingly, to avoid overcooling of the evaporation surface 3 thus maintaining the process efficiency.

In the embodiments of the radiation-collection element shown at FIGS. 5, 6, each of the pulsators 28 is in immediate fluid communication with the nozzles 10 or additional nozzles 29 from one side and with the fluid inlet 9 from another side; it is situated within the inner cavity 4 and, correspondingly, should be compact. Each pulsator 28 has an immediate fluid communication with the correspondent nozzles 10 or additional nozzles 29 to avoid the pulse attenuation in said fluid communication, which may occur because of the combination of relatively small spraying pulse time (in the above example less than about 0.5 s) and small sprayed fluid volume in a pulse.

The pulsator of the reflection-atomizing spray system (which, particularly, contains the radiation-collection element described above) for emitting intermittent pulsating flow of fluid with a predetermined opening pressure and a predetermined closing pressure in intermittent pulses of the fluid, with the predetermined opening pressure being more than the predetermined closing pressure, is shown in a closed position at FIG. 7A and in an open position at FIG. 7B. A pulsator comprises a pressure container 101 and a normally closed spring-loaded valve 102. The pressure container 101 comprises a limited flow rate inlet 103 to continuously supply the fluid into said pressure container means at a limited flow rate, a pulsator outlet 104 (shown with the nozzle coupled thereto) to emit the fluid in intermittent pulses from said pressure container 101. Directions of the fluid flow from the spray tube into the limited flow rate inlet 103 and from the pulsator outlet 104 through the nozzle is shown by arrows A and B correspondingly. The pressure container 101 comprises also an internal contact surface 105, and an expandable elastic assembly 106 being responsive to the fluid pressure in said pressure container 101 to provide a sufficient additional volume accessible for the fluid within said pressure container 101 at increasing of said fluid pressure from the predetermined closing pressure to the predetermined opening pressure. For the control of the length of the predetermined intervals, the limited flow rate inlet 103 is provided with a cylindrically shaped flow control passage 107. The normally closed spring-loaded valve 102 has closed and open positions, preset at the predetermined opening pressure to restrict access of the fluid within the pressure container 101 to the pulsator outlet 104 in the closed position at said fluid pressure less then nearly the predetermined opening pressure and to provide access of the fluid within the pressure container 101 to the pulsator outlet 104 in the open position at the fluid pressure no less than nearly the predetermined opening pressure. The normally closed spring-loaded valve 102 comprises the plug 108 having initial working area 109 being in fluid communication with the fluid within the pressure container 101 and is engaged in the closed position with the internal contact surface 105 in the closed-line contact defining said initial working area 109. The plug 108 is responsive to said fluid pressure no less than nearly the predetermined opening pressure to intermittently transfer into the open position by opening a clearance with the internal contact surface 105 in an opening direction 110. The plug 108 has an additional working area 111 accessible to the fluid in the open position and having sufficient projection perpendicular to the opening direction 110 to apply in said open position to the additional working area 111 the fluid pressure with changing the fluid momentum component in the opening direction 110 and to maintain said open position until said fluid pressure decreases to nearly the predetermined closing pressure thereby to complete the intermittent pulsating flow cycle.

The plug 108 has a form of a body of revolution with a surface of the additional working area 111 being concave. For projections perpendicular to the opening direction 110, a ratio of a sum of the projections of the initial working area 109 and the additional working area 111 to the initial working area 109 projection is no less than nearly a ratio of the predetermined opening pressure to the predetermined closing pressure.

The additional working area accessibility to the immediate applying of the fluid pressure after the transfer into the open position in conjunction with the immediate coupling of the nozzle to the pulsator outlet means allows realizing the short-period low-volume intermittent pulses with the momentary fluid rate necessary high for effective atomizing spray reflection, particularly, with moisturizing and subsequent sufficient vaporization or evaporation from the evaporation surface. In contradistinction to the prior art devices (such as suitable for irrigation and other systems elastic-tube pulsators), the pulsator comprising the spring-loaded valve plug having an additional working area is suitable for emitting the short-period low-volume pulse flow; it's compact and fits into the limited space of the inner cavity that renders it suitable for the radiation-collection element. Its characteristics are not changing with the time because they depend on said additional working area projection not changing with a time like elastic tube properties.

In operation of the pulsator, the plug 108 of the normally closed valve 102 is in fluid communication with the fluid within the pressure container 102 and engaged in the closing position with its internal contact surface 105 in the closed-line contact. The fluid is supplied to the pressure container 101 and its expandable elastic assembly 106 through flow control with flow passage 107, which diameter (the flow rate) is set in correspondence with predetermined pulse interval time. The plug 108 is not responsive to the fluid pressure until it reaches nearly the predetermined opening pressure to intermittently transfer into the open position by opening a clearance with the internal contact surface 105 in an opening direction 110. In the pulsator open position, the plug 108 has an additional working area 111 accessible to the fluid with applying the fluid pressure and changing the fluid momentum component in the opening direction 110 and maintaining said open position until said fluid pressure decreases to nearly the predetermined closing pressure thereby to complete the intermittent pulsating flow cycle. The immediate applying of the fluid pressure to the additional working area 111 after the transfer into the open position allows realizing the short-period low-volume intermittent pulses. Due to the immediate coupling of the nozzle (nozzles) to the pulsator outlet 104 the short-period low-volume intermittent pulses with the momentary fluid rate necessary high for the diffused fluid plume creation and, correspondingly, effective the evaporation surface moisturizing are being realized.

The radiation collection system comprises a combination of one or more radiation-collection elements, a selected number of which are arranged side by side to compose a radiation-collector assembly, such as a solar-energy collector assembly for any specific installation. Thus, a system with a single radiation-collection element is first described, and then examples are given for the assembly of several radiation-collection elements designated for the productivity enhancement.

As best illustrated at FIG. 8, the reflection-atomizing spray solar radiation collection system includes a described above in detail radiation-collection element 201, in its particular embodiment described below, mounted at inclination and having an outer black-coated radiation-absorbing surface 202 to be heated by solar radiation. Its evaporation surface 203 is situated underneath the radiation-absorbing surface 202 to be heated by transferred radiation energy facilitating the water vaporization or evaporation from said evaporation surface 203. The evaporation surface 203 defines an inner cavity 204 bounding it from its upper side. The radiation-collection element 201 has also a top end 205 and a bottom end 206 and a drainage outlet 207 at the bottom end 206. The radiation-collection element 201 is inclined to better receive radiant solar energy and to facilitate the fluid (specifically water) vaporization or evaporation from the evaporation surface 203 and gravity drainage of the fluid heated within the inner cavity 204 through the drainage outlet 207. The solar radiation collection system comprises also an elongated fluid-feed tube 208 longitudinally extended within the inner cavity 204, connected to a spray-tube fluid inlet 209 and provided with four pairs of nozzles 210 to spray the fluid within the inner cavity 204. The elongated fluid-feed tube 208 is coupled to two vertical tubes 211 and connected to the spray-tube fluid inlet 209 via one of them. The radiation-collection element 201 is provided with a reflection surface 212 with the nozzles 210 directed against it to diffuse and partition the fluid sprayed from the nozzles 210 into the inner cavity having the evaporation surface 203 moisturized by a part of said fluid. In a case of intensive solar radiation, the radiation-collection element 201 comprises additional nozzles (not shown) directed against the evaporation surface 203 to directly moisturize it.

The radiation-collection element 201 comprises an upper heat-transmission sheet 213 and a lower water-reflection sheet 214 coupled together. The upper transmission sheet 213 has the outer radiation-absorbing surface 202, which is blackened, and the inner evaporation surface 203. The top and bottom supports 215, 216 provided with the fluid-feed tube positioning devices 217 are attached to the upper transmission sheet 213. The fluid-feed tube positioning device 217 has an adjusting nut 218 on the thread 219 (position not shown) of the correspondent vertical tube 211 to adjust the position of the elongated fluid-feed tube 208 and the distance between the nozzles 210 and the reflection surface 212 to moisturize substantially entire evaporation surface 203. The adjusting nut 218 is situated on a threaded vertical tube 211 and secured in the adjusted position of the elongated fluid-feed tube 208 by a stopper sleeve 220 (position not shown) welded to the upper transmission sheet 213. The upper heat-transmission sheet 213 and the lower water-reflection sheet 214 are flanged and coupled at flanges by bolts 221.

The solar radiation collection system comprises also a cold-fluid (cold-water) inlet shut-off valve 222 and a piping 223 to supply the fluid under pressure to the spray tube fluid inlet 209 and a heated fluid collector (water tank) 224 having a collector outlet 225 (at least one collector outlet 225 for more complex system embodiment) for the collected (heated) fluid. The collector 224 having a feedback control of the free level of the collected fluid has a predetermined upper level 226 of the collected fluid and comprises an upper level control valve 227 having open and closed positions and arranged to limit the cold fluid supply in the closed position (shown at FIG. 8) at a heated-fluid level higher than about the predetermined upper level 226. The upper level control valve 227 is spring-loaded and has a threaded rod 228 with an adjusting nut 229 and a float 230 situated on the threaded rod 228. The upper-level control valve 227 is closed in an upper position (as shown) of the float 230. The upper-level control valve 227 is open (position not shown) at the level of the heated water in the collector 224 less than about the predetermined upper level 226. The upper-level control valve 227 controls the cold water flow in the piping 223 behind a cold-water inlet shut-off valve 222 (in its open position).

In the described preferable embodiment, the collector 224 additionally has a predetermined lower level 231 of the collected (heated) water and a lower-level control valve 232 having open and closed positions and connecting the cold-water inlet shut-off valve 222 and the heated water collector 224 in the open position (not shown) at level no higher than about the predetermined lower level 231 to provide a minimum water level in the collector 224. The lower-level control valve 232 is spring-loaded and has a threaded rod 233 with an adjusting nut 234 and a float 235 situated on the threaded rod 233. The lower-level control valve 232 is open at the level of the heated water in the collector 224 no higher than about the predetermined lower level 231 and correspondent lower position of the float 235 and the threaded rod 233 (position not shown); it's closed at the collected fluid level higher than about the predetermined lower level 231 and correspondent position (as shown) of the float 235 and the threaded rod 233. The lower-level control valve 232 controls a fluid communication of the water behind the upper-level control valve 227 (in its open position) with the heated water collector 224 through the lower-level control loop 236. The collector outlet 225 of the heated water collector 224 is shown connected to a hot-cold mixer faucet 237, suitable for an outdoor shower or for other small-house consumption type.

In the solar radiation collection system operation, the water is supplied at cold-water line pressure in the upper-level control valve 227 open position (not shown) through the piping 223 to the radiation-collection element 201; it's sprayed within the inner cavity 204 in jets (as shown) from the nozzles 210 onto the reflection surface 212 having the evaporation surface 203 moisturized by a part of said fluid diffused after reflection from the reflection surface 212 with consequent evaporation or vaporization and heating the draining part of the fluid. In a case of intensive solar radiation, if moisturizing by the diffused part of fluid is insufficient, the fluid sprayed into the inner cavity 204 is partitioned between the nozzles 210 and additional nozzles (not shown) directed against the evaporation surface 203 to moisturize it additionally or instead of said diffused part of the fluid with sufficient vaporization or evaporation from said evaporation surface 203 and consequent heating of remained (drained) part of the fluid.

From the radiation-collection element 201 the heated fluid is evacuated through the drainage outlet 207 to the collector 224 and, through the collector outlet 225, to the hot-cold mixer faucet 237 for consumption. If the heated water level in the collector 224 becomes higher than the predetermined upper level 226, the upper-level control valve 227 switches into the closed position (as shown), the cold water supply to the piping 223 and to the elongated fluid-feed tube 208 is ceased. Consequently, the shown spraying within the inner cavity 204 is interrupted until the sufficient part of the heated water outflows for consumption through collector outlet 225. If the heated water level in the collector 224 becomes lower than the predetermined lower level 231, the lower-level control valve 232 opens and the cold water is supplied to the collector 224 through the lower-level control loop 236 until the water level reaches the predetermined lower level 231 with closing the lower-level control valve 232 (in the closed position as shown).

In contradistinction to the prior art systems, employing a reflection surface in conjunction with pressure supply means and nozzles directed against said reflection surface allows diffusing the sprayed fluid within said inner cavity with its partition on moisturizing and remaining parts to moisturize the evaporation surface by a part of the sprayed fluid having said moisturizing part of the sprayed fluid sufficiently vaporized or evaporated and been transferring heat to the draining part of the fluid thus increasing efficiency and enhancing the fluid-heat capacity. The enhanced system capacity is particularly feasible in conjunction with a collector means having a free surface of the drained heated fluid with a predetermined upper level of the fluid and an upper level feedback control means arranged to limit the cold fluid supply at higher than about said predetermined upper level of the fluid. As well understood by those skilled in the art, the control means (valve) design is exemplary and may vary dependently on conditions of manufacturing and use.

The solar radiation collection system with the solar-energy collector assembly of two radiation-collection elements 201 is shown at FIG. 9 as it may be applied to an outdoor facility. The radiation-collection elements 201 are mounted at inclination with their flanges 238 and the mounting hardware bolts 221 on the solar-energy collector assembly structure support frame 239. The water supply piping 223 is connected to each radiation-collection element 201 provided with the fluid-feed tube positioning devices 217. The drainage outlets 207 are coupled to the heated water collector (tank) 224 having the upper-level and lower-level control valves 227, 232. The heated water collector outlet is connected to a tap of an outdoor shower (not shown).

In the system operation in a case of sufficient consumption of the heated water, the water supplied through the piping 223 is sprayed into and heated within the radiation-collection elements 201, then drained through the drainage outlets 207 to the tank 224. In a case of excessive consumption of the heated water, the free level of the heated water in the tank 224 declines to the predetermined lower level. The free level of the heated water is not declined below the predetermined lower level due to the feedback control by the lower-level control valve 232 providing in its open position the cold-water supply additionally to the heated water drained through the drainage outlets 207. In a case of insufficient consumption of the heated water, the free level of the heated water in the tank 224 rises to the predetermined upper level; the tank 224 becomes full. In the closed position of the upper-level control valve 227 corresponding to the predetermined upper level, the water is not sprayed into the radiation-collection elements 201 until the sufficient consumption resumes. The tank 224 is subjected itself to the solar radiation to sustain the supplied water temperature therein. In distinction to the known open-loop systems with thermosyphonic circulation, due to the higher heating efficiency, the higher drained water temperature is reached and, due to the absence of plurality of channels, the system is not susceptible to clogging and freezing in the cold-winter climate.

In the embodiment preferable for a small house shown at FIG. 10, the solar radiation collection system with a few radiation-collection elements 201 is shown with supply means additionally comprising a pump 240 to provide the water circulation. The radiation-collection elements 201 are mounted to better receive radiant energy and to permit drainage of the fluid heated within the inner cavity and connected via the drainage outlet 207 to the heated water collector (tank) 224, which, in the described preferable embodiment, is provided with two collector outlets 225, 225a (the first one connected to the pump 240 to facilitate the heated water circulation and another one connected to a drainage valve 241 to supply the heated water to the house) and, optionally, has an electrical heating device (not shown) to provide reliable additional water heating not depending on the solar radiation level. The pump 240 having pump inlet and outlet sides 242, 243 is coupled at its inlet side 242 to the corresponding collector outlet 225 to supply through the pump outlet side 243 the collected (heated) water under the pump pressure normally exceeding the cold-fluid supply pressure. The cold-fluid inlet means includes the cold-water shut-off valve 222 and a cold-fluid check (one-way) valve 244 with its outlet side being in fluid communication with the pump outlet side 243 at the working pump pressure exceeding the cold-fluid supply pressure. The pump outlet side 243 is being in fluid communication with the piping 223 at working pump pressure of the collected (heated) fluid (measured by a pump outlet manometer 245) exceeding the cold-water supply pressure (at the inlet side of the cold-fluid check valve 244) to facilitate the heated water supply the piping 223 and circulation through the radiation-collection element 201 back to the heated water collector (tank) 224.

The pump outlet side 243 is additionally provided with a working-pressure check (one-way) valve 246 with its outlet side being in fluid communication with the cold-fluid check valve 244 outlet side to facilitate the cold-water supply to the piping 223 at the working pump pressure at the inlet side of the working-pressure check valve 246 (measured by the pump outlet manometer 245) not exceeding the cold-water supply pressure (at the inlet side of the cold-fluid check valve 244). The heated water tank 224 has the predetermined upper level 226 of the fluid (below the level of an emergency overflow drain shown by a dashed line) and comprises the upper level control valve 227 having open and closed positions (shown in the closed position at the fluid level about the predetermined higher level 226). The heated water tank 224 additionally, having the predetermined lower level 231 of the fluid, comprises the lower level control valve 232 having open and closed positions with a gradual transfer from open position at the fluid level about the predetermined lower level 231 to the completely closed position at the fluid level higher than the predetermined lower level 231 but lower than the predetermined upper level 226, a feedback loop 247 connecting the pump outlet side 243 and the heated water tank 224 at the open position (not shown) of the lower level control valve 232. The predetermined lower level 231 is higher relatively the collector outlet 225 connected to the pump inlet side 242 to provide a minimum heated water level necessary for the pump suction. As well understood by those skilled in the art, an electrical limit switch (not shown) may be employed for turning off the pump 240 at a certain heated water level lower than the predetermined lower level 231.

In the system operation at free fluid level about the predetermined lower fluid level 231 in the open positions of the upper and lower level control valves 227, 232 (positions not shown), the heated water flow back to the water tank 224 is enabled via the feedback loop 247 through the lower level control valve 232, at that, because of the low working pump pressure at the pump outlet manometer 245, the working-pressure check valve 246 is closed. The cold water is supplied through the open cold-fluid check valve 244 and the piping 223 to the radiation-collection elements 201 and then via the drainage outlet 207 to the heated water tank 224. The heated water flow via the feedback loop 247 should dampen possible self-oscillations in the water tank 224 going with the electrical limit switch of the pump 240 turning off and on in the process of the heated water draining from the radiation-collection elements 201 and pumping out by the pump 240.

In a process of filling of the water tank 224 above the predetermined lower level 231 but below the predetermined upper level 226, the lower level control valve 232 is gradually switching into the closed position (as shown) starting the system normal operation with opening the working-pressure check valve 246 due to the pump 240 pressure normally exceeding the cold-fluid supply pressure. The heated water circulation through the radiation-collection elements 201 is enabled while the cold water supply is discontinued due to the cold-fluid check valve 244 complete closing below the predetermined upper level 226. In a case of filling the water tank 224 to about the predetermined upper level 226, the upper level control valve 227 is switching into closed position (as shown) making impossible the cold-fluid supply into the radiation-collection elements 201. While both the upper level control valve 227 and the lower level control valve 232 are closed (as shown), the working pump pressure at the inlet of the working-pressure check valve 246 exceeds the cold-fluid supply pressure at the inlet of the cold-fluid check valve 244 with the pump outlet side 243 being in fluid communication with the piping 223 facilitating the heated water circulation through the radiation-collection elements 201, the drainage outlet 207 to the heated water tank 224.

The above-described regime continues until the heated water is consumed through the collector outlet 225a with correspondent switching of the upper level control valve 227 into the open position (not shown) and consequent opening of the lower level control valve 232 with decreasing the working pump pressure at the pump outlet manometer 245 and opening the cold-fluid check valve 244 when the cold-water supply opens again. In distinction to the known open-loop systems with thermosyphonic circulation collectors, the cold water flows not straight into the water tank 224 but through the radiation-collection elements 201 that increases the process efficiency and allows consumers to receive the heated water faster. Due to the absence of plurality of channels, the system is not susceptible to freezing in the cold-winter climate supposing proper winter maintenance with shutting off the cold-water shut-off valve 222 and draining the radiation-collection elements 201.

In the embodiment preferable for a house or a building with multiple consumers shown at FIG. 11, the supply means comprises a water boiler 248 as an additional heating device providing the temperature and pressure stability of hot-water supply for consumption. The pump outlet side 243 is connected to the piping 223 and the radiation-collection elements 201 via the water boiler 248 and an additional working-pressure check (one-way) valve 249. The water boiler 248 has fluid communication at its inlet side with the outlet side of the pump-outlet working-pressure check valve 246. At its outlet side, the boiler 248 is connected (in its stand-by regime) through the additional working-pressure check valve 249 to the outlet side of the cold-fluid inlet check valve 244 and through a circulation shut-off valve 250 to the piping 223. The upper level control valve 227 has open and closed positions (shown in the closed position at the fluid level about the predetermined higher level 226). The feedback loop 247 connects the pump 240 and the heated water tank 224 in the open position (not shown) of the lower level control valve 232 limiting said fluid communication at the heated water level higher than about the predetermined lower level 231 and completely closed (as shown) at lower than the predetermined higher level 226. In its boiling regime, the boiler 248 is disconnected from the additional working-pressure check valve 249, with possibility of temporary reflection-atomizing spray solar radiation collection system functioning accordingly scheme at FIG. 10.

The circulation shut-off valve 250 is normally open; it's switched into closed position for the independent use of the boiler 248. For the independent water heating without heated water circulation through the radiation-collection elements 201, even in the closed position (as shown) of the upper level control valve 227 at the heated water tank 224 level higher than the predetermined upper level 226, the supply means is additionally provided with the bypassing cold-water shut-off valve 251, which is normally closed simultaneously with the circulation shut-off valve 250 being normally open (connection between the shut-off valves 250 and 251 is shown by a dashed line), and the bypassing cold-water check valve 252 connected to the boiler 248 inlet side. At the open position of the bypassing cold-water shut-off valve 251, the circulation shut-off valve 250 is simultaneously being closed shutting off the piping 223.

In the normal operation, while the upper level control valve 227 is open and the lower level control valve 232 is gradually closing, the working pump pressure at the inlet of the working-pressure check valve 246 (measured by the pump outlet manometer 245) exceeds the boiler 248 pressure, opening said working-pressure check valve 246 and providing access of the collected heated water to the boiler 248, while the cold water supplied through the cold-fluid check valve 244 is heated in the radiation-collection elements 201 and collected in the heated water tank 224. When, at establishing correspondent working pump pressure, the boiler 248 pressure becomes to be exceeding the cold-fluid supply pressure at the inlet of the cold-fluid check valve 244, the additional working-pressure check valve 249 is opening; the cold-fluid inlet check valve 244 is closing, allowing the fluid communication of the pump outlet side 243 with the piping 223 and the radiation-collection elements 201 via the boiler 248 (in its stand-by regime, thus eliminating or reducing energy consumption for providing the temperature stability). The pump 240, at sufficient working pump pressure, facilitates the heated water circulation through the radiation-collection elements 201, the drainage outlet 207 to the heated water tank (collector) 224.

In a case of low heated water temperature, the boiler 248 provides necessary additionally water heating under the working pressure to the predetermined temperature level in a cycle of the circulation to maintain the temperature and pressure stability of the hot fluid supplied for consumption. At the water level in the water tank 224 higher than the predetermined upper level 226, the upper level control valve 227 closes the cold water supply. The water tank 224 overflowing in the manual regime may be also prevented by the heated water intake through the collector outlet 225a with the drainage valve 241 in an open position. After the hot water from the boiler 248 has been supplied for consumption, the heated water level in the water tank 224 decreases to about the predetermined lower level 231; the lower level control valve 232 opens the feedback loop 247 decreasing the pressure at the pump-outlet working-pressure check valve 246 and opening the cold-fluid supply through the inlet check valve 244 through open circulation shut-off valve 250 into the piping 223.

For the independent operation of the boiler 248, the upper level control valve 227 optionally may be short-circuited at the open position of its shut-off valve 251 corresponding to a closed position of the circulation shut-off valve 250. The water is supplied to the water boiler 248 through the bypassing cold-water check valve 252 at closed pump outlet check valve 246. The water is heated in the water boiler 248 without circulation through the radiation-collection elements 201 and without water supply to the water tank 224.

As shown at FIG. 12, an integrated group of the radiation-collection elements 201 are mounted with their flanges 238 on the solar-energy collector assembly structure support frame 239 on a house structure roof R. Their connections through the drainage outlet 207 and the piping 223, as well as the fluid-feed tube positioning devices 217 are accessible for assembly and maintenance. The system allows the water circulation control maximizing the heating efficiency and the system productivity. The design of the solar energy collector assembly may vary as well understood by those skilled in the art. Due to the absence of plurality of channels, the system is not susceptible to freezing in the cold-winter climate supposing proper winter maintenance with shutting off the cold-water supply and draining the radiation-collection elements 201.

The concentrated solar power radiation-collection system embodiment is shown at FIG. 13. The radiation-collection system mounted on the roof R comprises flexible parabolic reflector concentrator 300 and reflection-atomizing-spray radiation receiver 301, embodying the reflection-atomizing spray radiation-collection element according to present invention. While employing the sun-tracking flexible parabolic reflector concentrator increases the capital expenditures, the further increasing the system efficiency and capacity is provided.

As best illustrated at FIG. 14, the solar radiation receiver comprises casing of receiver 301 having an outer black-coated and glazed radiation-absorbing surface 302 to be heated by concentrated solar radiation and an evaporation surface 303 from the opposite side of the radiation-absorbing surface 302. The evaporation surface 303 partially defines an inner cavity 304 bounding it from the radiation direction. The radiation-collection element has also a top end 305 and a bottom end 306; a drainage outlet 307 is situated at the lower point of the bottom end 306. (In another embodiment, not shown, the drainage outlet 307 is situated above the lower point of the bottom end 306 to create within the inner cavity 304 a fluid pool sufficient for partial heat accumulation in a case of direct steam generation). The casing of receiver 301 is adapted to be mounted at inclination and inclined to better receive concentrated radiant solar energy and to facilitate the water vaporization or evaporation from the evaporation surface 303 and gravity drainage of the fluid (specifically water) heated within the inner cavity 304 through the drainage outlet 307. The solar radiation collection system comprises also an elongated fluid-feed tube 308 longitudinally extended within the inner cavity 304 and connected to a water inlet 309 and provided with nozzle 310 to spray the fluid within the inner cavity 304. The elongated fluid-feed tube 308 is attached to the vertical tube 311 provided with the water inlet 309. The inner side of the casing of receiver 301 comprises inner surfaces defining the inner cavity 304, particularly, along with the evaporation surface 303, a casing reflection surface 312 facing the evaporation surface 303. The casing 301 consists of an upper heat-transmission sheet 313 and a lower water-reflection sheet 314 coupled together. The upper transmission sheet 313 has, from one side, the outer radiation-absorbing surface 302, which is blackened and glass-covered, and the inner evaporation surface 303 from another side. The lower water-reflection sheet 314 has the casing reflection surface 312. The top end 305 and the lower water-reflection sheet 314 are joined with pressure-resistant supports 315, 316. The pressure-resistant support 315 of the vertical tube 311 is connected with a threaded positioning device 317 having an adjusting nut 318 and a cup with internal thread 319 provided with gaskets 320 to adjust the position of the nozzle 310. The upper heat-transmission sheet 313 is arched (pressed to the convex shape) and coupled at flanges by bolts 321. The support 316 is connected with a positioning element 322 provided with a reflection surface 323 situated within the inner cavity 304 and facing the evaporation surface 303. The positioning element 322 is joined with adjusting screw 325 to adjust the reflection surface 323 and atomized jet plume position relatively the evaporation surface 303. The nozzle 310 is directed against the reflection surface 323 in such a way that the reflected jet axis is directed to the upper heat-transmission sheet 313 center (shown with jet axis directed thereonto). The upper heat-transmission sheet 313 is shaped correspondingly the reflected from the reflection surface 323 spray distribution plume. The atomized in such a way fluid spray is diffused within the inner cavity 304 with moisturizing the practically entire evaporation surface 303 by a part of the fluid. The evaporation surface 303 may have the indentation of artificial pores of depth and diameter about 0.1 to 1 mm (increasing at higher irradiation level) to intensify bubble development and moisturizing liquid boiling with subsequent entrainment of the liquid in a diffused plume and heat transfer enhancement. The casing of receiver 301 is additionally provided by a steam passage 326 provided with a bypassing valve 327. Temperature and fluid flow rate measurement devices are not shown.

In operation, the radiation-collection element is arranged respectively the concentrated solar radiation direction having an evaporation surface 303 to be subjected to heating by concentrated radiation energy. The fluid is supplied to the radiation receiver through the inlet 309 and sprayed in jet from nozzle 310 within the inner cavity 304. The jets are directed onto the reflection surface 323 to diffuse the fluid within said inner cavity with moisturizing the evaporation surface by a part of the fluid to enhance the water-heating efficiency. After arranging a position of jets from nozzles 310 relatively the reflection surface 312, the fluid to be diffused within the inner cavity 304 and nearly entire the evaporation surface 303 to be moisturized by a part of the sprayed fluid with practically complete vaporization or evaporation of said moisturizing part of the sprayed fluid and having a remaining part of the fluid in the plume to be heated by the evaporated moisturizing part of the fluid. The heated fluid is evacuated from the inner cavity 304 through the drainage outlet 307, where the temperature measurement is carried out. With decreasing the distance between the nozzle 310 and the reflection surface 323, transferred in a direction to the evaporation surface 303, the diffused water velocity is increased and so the fraction of the moisturizing part of the fluid falling on the evaporation surface 303. The fluid vaporization or evaporation intensifies on sufficient part of its area until the evaporation surface 303 is overcooled. Optimization of the fluid vaporization or evaporation and higher heat abstraction from the evaporation surface 303 corresponds to higher output temperature. Practically, at given water supply (the nozzle 310 orifice diameter) and water-heating productivity, said distance is been optimized by the criteria of maximization of the temperature of the water supplied for consumption through the drainage outlet 307 thus enhancing the fluid-heating efficiency of the radiation-collection element. After the distance adjusting, the maximum productivity of the water supply through the fluid inlet 309 is being established for the required radiation-collection element water temperature difference. In contradistinction to the prior art methods, the spraying is performed, particularly onto the reflection surface, with partition of the fluid on moisturizing and remaining parts to moisturize the evaporation surface by a part of the sprayed fluid having said moisturizing part of the sprayed fluid sufficiently vaporized or evaporated and thus transferring heat to the draining fluid with increased efficiency, because the latent heat of vaporization is used for heating. The moisturizing and evaporated part of the fluid (specifically water) accounts for no more than 20% of the mass of the water sprayed within the inner cavity, which fraction is controlled by the fluid-feed tube positioning devices 317, 325.

For example, at the moisturizing part accounting for 12% of the mass of the water sprayed within the inner cavity, the draining part of the water may be heated by the radiation-collection element water temperature difference up to 80 degrees with efficiency up to about 80%, which would be about 2 times as high as for the known open-loop systems with thermosyphonic circulation collectors (flat-plate collectors, which also are unreliable for concentrated solar power receiving because of possibility of boiling water). At decreasing the solar radiation intensity, for maintaining the same temperature difference, the water supply pressure should be reduced (reducing the process productivity by 50% at the same fraction of the moisturizing part of the fluid 12%) or, for maintaining the same process efficiency, the fraction of the moisturizing part of the fluid should be decreased to 8-10% with lesser reducing the process productivity (by 25-35%) and moderately lower temperature difference establishing (about 60 degrees). At high-level solar radiance, when the direct steam generation is possible, it may be used for the summer absorption-type air conditioning.

In example, the concentrated solar power radiation-collection system consists of 9.7 m² reflector, atomizing-spray receiver with 0.61*0.61 m² black-coated and glazed absorption sheet, suitable for most domestic applications. At 850 W/m² solar radiation intensity (summer), 5 bar supply pressure, the nozzle orifice diameter 1.2 mm, the hourly productivity is 59 l/h, at temperature difference 51° C. At 600 W/m² (winter), the hourly productivity is 29 l/h (at diameter 0.85 mm), at temperature difference 71° C. The estimated water heating efficiency is about 75%.

The described above embodiments of the present invention are widely applicable for solar radiation collection in the correspondent climate conditions, preferably ones with sufficient percentage of sunny days in a year. Although the particular embodiments of the radiation-collection element as well as of the system and method of collecting radiant energy to heat fluid are described, it is not intended that such description be construed as limiting the scope of this invention, except as set forth in the following claims.

What is claimed is:

1. A reflection-atomizing spray system for collecting heat, such as solar radiant energy, by heating fluid, such as water, the system comprising a supply means, in order to supply the fluid under pressure, and at least one heat-collection element having an inner cavity; said at least one heat-collection element comprises:
   a heat-transmission wall having an opaque evaporation surface in order to facilitate the fluid vaporization or evaporation from the evaporation surface within the inner cavity;
   at least one jet-reflection surface situated within the inner cavity;
   an inner cavity outlet means in order to evacuate the fluid from the inner cavity; and
   an adjustable spray means being in fluid communication with the supply means and comprising at least one nozzle in order to spray the fluid in at least one jet within the inner cavity, and wherein:
      the at least one jet-reflection surface is positioned facing toward the evaporation surface;
      the at least one nozzle is directed away from the evaporation surface onto the at least one jet-reflection surface in order to have the at least one jet reflected from the at least one jet-reflection surface with a reflection direction onto the evaporation surface having the at least one reflected jet atomized in a plume within the inner cavity and the evaporation surface moisturized by the fluid in the plume.

2. The system of claim 1, wherein the at least one jet-reflection surface is provided with at least one positioning element to adjust a position of the at least one jet-reflection surface relative to the evaporation surface in order to adjust a position of the plume relatively to the evaporation surface and to control a moisturizing fraction of the fluid in the plume and a temperature of the fluid evacuated from the inner cavity.

3. The system of claim 2, wherein the at least one nozzle is provided with at least one nozzle positioning device in order to adjust a position of the at least one jet relative to the at least one jet-reflection surface and to further control the moisturizing fraction of the fluid in the plume, said moisturizing fraction comprises no more than 20% of the fluid in the plume.

4. The system of claim 2, wherein the at least one nozzle is additionally coupled with at least one pulsator means being in fluid communication with the supply means in order to spray the fluid in intermittent pulses at nearly predetermined intervals and to further control the temperature of the fluid evacuated from the inner cavity.

5. The system of claim 1 additionally comprising a collector means, wherein the supply means comprises a piping and a cold-fluid inlet means connected to the spray means via the piping in order to facilitate a supply of the fluid from the cold-fluid inlet means under pressure to the spray means bypassing the collector means; the collector means is being in fluid communication with the inner cavity outlet means in order to collect the fluid evacuated from the inner cavity; the collector means comprises at least one collector outlet means; the collector means has a predetermined upper level of the fluid and additionally comprises an upper-level control means arranged to restrict the fluid supply from the cold-fluid inlet means via the piping to the spray means to at least said predetermined upper level of the fluid in the collector means.

6. The system of claim 5, wherein the supply means additionally comprises a pump means having pump inlet and outlet sides; the pump inlet side is connected to the at least one collector outlet means; the pump outlet side is in fluid communication with the spray means via a working-pressure check valve in order to facilitate a supply of the fluid from the collector means to the spray means under pressure, which is at least the pressure at the cold-fluid inlet means.

7. The system of claim 6, wherein the cold-fluid inlet means is connected to the spray means through a cold-fluid check valve.

8. The system of claim 7, wherein the collector means additionally has a predetermined lower level of the fluid and comprises a lower-level control means arranged to restrict the fluid supply from the collector means to the spray means at or lower than said predetermined lower level of the fluid in the collector means.

9. The system of claim 8, wherein the lower-level control means comprises a feedback loop connecting the pump outlet side and the collector means in order to restrict the fluid supply from the collector means to the spray means by arranging a fluid flow from the pump outlet side to the collector means at or lower than the predetermined lower level of the fluid in the collector means.

10. The system of claim 7, additionally comprising a pressure vessel means, wherein the pump outlet side is in fluid communication via the working-pressure check valve with pressure vessel means, which is being in fluid communication with the spray means via a an additional working-pressure check valve.

11. The system of claim 10, wherein the pressure vessel means is additionally provided with a heater means to maintain the temperature stability of the fluid in the vessel means.

12. A reflection-atomizing spray method for collecting heat, such as solar radiant energy, by heating fluid, such as water, the method comprising:
   supplying the fluid under pressure to an inner cavity of at least one heat-collection element having a heat-transmission wall;
   spraying the fluid in at least one jet within the inner cavity in order to facilitate the fluid vaporization or evaporation from an evaporation surface of the heat-transmission wall;

evacuating the fluid from the inner cavity, and wherein:
- the at least one jet-reflection surface is positioned facing toward the evaporation surface;
- the at least one jet is directed away from the evaporation surface onto the at least one jet-reflection surface situated within the inner cavity in order to have the at least one jet reflected from the at least one jet-reflection surface with a reflection direction onto the evaporation surface having the at least one reflected jet atomized in a plume within the inner cavity and the evaporation surface moisturized by the fluid in the plume.

13. The method of claim 12, wherein a position of the at least one jet-reflection surface relative to the evaporation surface is adjusted in order to adjust a position of the plume relative to the evaporation surface and to control a moisturizing fraction of the fluid in the plume and the temperature of the fluid evacuated from the inner cavity.

14. The method of claim 13, wherein the spraying is performed by arranging a position of the at least one jet of the fluid relatively to the at least one jet-reflection surface in order to further control the moisturizing fraction of the fluid in the plume; the moisturizing fraction comprises no more than 20% of the fluid in the plume.

15. The method of claim 13, wherein the fluid is sprayed in intermittent spraying pulses at nearly predetermined intervals in order to further control the temperature of the fluid evacuated from the inner cavity.

16. The method of claim 15, wherein the nearly predetermined intervals between the intermittent spraying pulses are set for time no less than a duration of the intermittent spraying pulse in order to have the moisturizing fraction of the fluid nearly completely evaporated.

17. The method of claim 15, wherein the nearly predetermined intervals between the intermittent spraying pulses are set for time no more than about 10 times as much as the intermittent spraying pulse duration in order to provide continuous vaporization or evaporation of the a moisturizing fraction of the fluid.

18. The method of claim 17, wherein the intermittent spraying pulse duration is between 0.1 and 0.5 seconds.

* * * * *